(12) United States Patent
Coppersmith et al.

(10) Patent No.: US 6,192,129 B1
(45) Date of Patent: *Feb. 20, 2001

(54) METHOD AND APPARATUS FOR ADVANCED BYTE-ORIENTED SYMMETRIC KEY BLOCK CIPHER WITH VARIABLE LENGTH KEY AND BLOCK

(75) Inventors: Don Coppersmith, Ossining; Rosario Gennaro, New York; Shai Halevi, Heartsdale; Charanjit S. Jutla, Elmsford, all of NY (US); Stephen M. Matyas, Jr., Manassas, VA (US); Mohammed Peyravian, Cary, NC (US); David Robert Safford, Brewster, NY (US); Nevenko Zunic, Wappingers Falls, NY (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/018,630

(22) Filed: Feb. 4, 1998

(51) Int. Cl.[7] ........................................................ H04L 9/06
(52) U.S. Cl. .............................. 380/259; 380/37; 380/29
(58) Field of Search ................................ 380/29, 37, 259, 380/264, 265

(56) References Cited

U.S. PATENT DOCUMENTS

| | | |
|---|---|---|
| 4,375,579 | 3/1983 | Davida et al. . |
| 5,432,848 | 7/1995 | Butter et al. . |
| 5,481,613 | 1/1996 | Ford et al. . |
| 5,513,262 | 4/1996 | van Rumpt et al. . |
| 5,548,648 | 8/1996 | Yorke-Smith . |
| 5,623,549 | * 4/1997 | Ritter ...................................... 380/37 |
| 5,666,414 | 9/1997 | Micali . |
| 5,673,319 | 9/1997 | Bellare et al. . |
| 5,825,886 | * 10/1998 | Adams et al. ...................... 380/37 X |

OTHER PUBLICATIONS

"Description of a New Variable–Length Key, 64–Bit Block Cipher (Blowfish)", Bruce Schneier Counterpane Systems, Oak Park, IL, http://www.cryptocard.com/algorith/blowfish.html/Internet Article Retrieved Jan. 22, 1998 dated Jan. 30, 1996.

Dr. Dobb's Journal, Apr. 1994, vol. 20, issue 4, "The Blowfish Encryption Algorithm", pp. 38, 40, 98–99.

Cambridge Security Workshop, Cambridge, U.K., Dec. 9–11, 1993 Proceedings, "Safer K–64: A Byte–Oriented Block–Ciphering Algorithm", J.L. Massey, pp. 1–17.

Second International Workshop, Leuven, Belgium, Dec. 14–16, 1994 Proceedngs, "The RC5 Encryption Algorithm", R. L. Rivest, pp 86–96.

15th Annual International Cryptology Conference, Santa Barbara, CA, Aug. 27–31, 1995, "On Differential and Linear Cryptanalysis of the RC5 Encryption Algorithm", B.S. Kalinski and Y.L. Yin, pp 171–184.

5th IMA Conference, Cirencester, UK, Dec. 18–20, 1995 Proceedings, "A Broadcast Key Distribution Scheme Based on Block Designs", V. Korjik, M. Ivkov, Y. Merinovich, A. Barg, H, van Tilborg, pp 3–12.

* cited by examiner

Primary Examiner—Gilberto Barrón, Jr.
(74) Attorney, Agent, or Firm—Jeanine S. Ray-Yarletts; Marcia L. Doubet

(57) ABSTRACT

A method and apparatus for an advanced byte-oriented symmetric key cipher for encryption and decryption, using a block cipher algorithm. Different block sizes and key sizes are supported, and a different sub-key is used in each round. Encryption is computed using a variable number of rounds of mixing, permutation, and key-dependent substitution. Decryption uses a variable number of rounds of key-dependent inverse substitution, inverse permutation, and inverse mixing. The variable length sub-keys are data-independent, and can be precomputed.

27 Claims, 10 Drawing Sheets

FIG. 6

This is S-box 0:

$S^{<0>}$ =  {187,198,75,92,145,229,128,30,79,48,78,37,226,149,15,61,
170,10,131,253,154,49,153,184,250,60,203,191,85,210,99,152,
64,241,117,40,124,68,185,112,6,35,59,211,178,252,5,104,
255,81,240,200,32,45,166,181,188,23,225,16,220,44,123,160,
206,114,55,127,34,151,80,119,111,74,38,58,231,52,158,209,
29,77,4,129,233,12,63,195,130,237,159,108,141,82,228,98,
28,155,248,110,172,175,143,171,14,122,243,140,146,71,47,22,
147,227,20,19,33,138,67,169,235,215,1,168,17,95,70,167,
207,202,238,50,239,46,0,223,245,217,109,105,179,251,73,56,
84,66,193,174,222,126,21,7,120,57,93,192,197,213,134,224,
182,242,180,139,133,150,204,216,31,27,24,102,196,103,100,97,
90,136,113,62,18,8,135,194,186,94,42,13,254,87,125,189,
244,43,53,201,247,219,161,76,116,165,173,69,177,212,72,11,
142,163,236,39,144,214,54,107,106,234,91,199,88,232,164,51,
157,218,9,86,162,41,89,221,137,96,190,208,230,249,121,101,
176,132,25,65,115,2,148,118,36,83,26,183,246,205,3,156}

This is S-box 1:

$S^{<1>}$ =  {94,241,212,205,13,86,233,17,7,242,194,45,131,77,81,234,
210,82,39,40,249,15,230,12,134,113,223,148,41,147,98,57,
229,124,64,106,207,179,23,119,66,16,22,213,83,30,132,232,
143,54,171,217,135,76,44,253,189,152,47,130,85,84,151,20,
183,122,37,34,175,67,125,90,206,8,178,31,248,136,129,153,
236,239,140,80,214,155,21,115,50,49,123,72,2,200,227,5,
211,91,75,187,202,220,95,73,109,117,32,88,56,165,145,92,
188,203,144,100,199,216,114,172,198,61,215,53,97,58,225,103,
93,55,120,252,192,69,139,6,36,243,48,176,79,154,46,121,
191,52,3,168,201,190,177,11,250,228,181,38,247,170,71,111,
180,118,89,184,27,4,14,251,185,0,193,255,163,28,167,126,
231,19,245,60,63,42,160,108,219,226,156,235,149,102,196,116,
186,174,1,112,65,166,101,24,208,68,142,204,107,164,158,246,
254,99,222,157,51,221,169,209,110,9,128,70,105,141,137,59,
25,173,159,43,10,244,74,78,238,195,138,18,26,197,33,29,
150,224,133,62,161,104,146,162,96,218,240,127,35,237,87,182}

Sample Substitution Box

| | values |
|---|---|
| 0 | 1 |
| 1 | 3 |
| 2 | 2 |
| 3 | 0 |

Sample Inverse Substitution Box

| | values |
|---|---|
| 0 | 3 |
| 1 | 0 |
| 2 | 2 |
| 3 | 1 |

METHOD AND APPARATUS FOR ADVANCED BYTE-ORIENTED SYMMETRIC KEY BLOCK CIPHER WITH VARIABLE LENGTH KEY AND BLOCK

RELATED INVENTIONS

IBM application serial number 09/018,707 entitled "Method and Apparatus for Advanced Symmetric Key Block Cipher with Variable Length Key and Block" filed Feb. 4, 1998.

BACKGROUND OF THE INVENTION

1. Field of the Invention

The present invention relates to cryptography, and deals more particularly with a symmetric key cipher for encryption and decryption, using a block cipher algorithm. This algorithm allows the block size, key size, and number of rounds of ciphering to vary.

2. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

In addition to preventing unintended disclosure, cryptography also provides a mechanism for preventing unauthorized alteration of data transmitted or stored in electronic form. After the data has been transformed cryptographically, an unauthorized person is unlikely to be able to determine how to alter the data, because the specific data portion of interest cannot be recognized. Even if the unauthorized user knew the position of the data portion within a data file or message, this position may have been changed by the transformation, preventing the unauthorized person from merely substituting data in place. If an alteration to the transformed data is made by the unauthorized user despite the foregoing difficulties, the fact of the alteration will be readily detectable, so that the data will be considered untrustworthy and not relied upon. This detection occurs when the transformation is reversed: the encrypted data will not reverse to its original contents properly if it has been altered. The same principle prevents unauthorized addition of characters to the data, and deletion of characters from the data, once it has been transformed.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Mathematical algorithms are used to describe the functioning of ciphers. The goal of a cipher is to be computationally infeasible to "break"—that is, it must be nearly impossible to "guess" or derive the original data content from any series of computations that can be performed on the transformed data, absent knowledge of how the encryption was accomplished. Use of a "key" during the encryption and decryption processes helps make the cipher more difficult to break. A key is a randomly-generated number factored into operation of the encryption to make the result dependent on the key. The value used for the key in effect "personalizes" the algorithm, so that the same algorithm used on the same input data produces a different output for each different key value. When the value of this key is unknown to the unauthorized persons, they will not be able to duplicate or to reverse the encryption. Provided that the key is kept secret, the algorithm that performs the ciphering can be made public. The key will be known to the parties intended to encrypt and decrypt the data: they can use the key to "lock" and "unlock" the data contents, whereas unauthorized persons cannot. When the same key is used for encrypting and for decrypting, the key is referred to as being "symmetric".

A cipher to be used in a computer system can be implemented in hardware, in software, or in a combination of hardware and software. Hardware chips are available that implement various ciphers. Software algorithms are known in the art as well.

A commonly used cipher is known as the Data Encryption Algorithm ("DEA"). This algorithm was developed by scientists of the International Business Machines Corporation ("IBM"), and formed the basis of a United States federal standard known as the Data Encryption Standard ("DES"), which was adopted in 1977. DES has been in use since that time. A variant of the DES algorithm, known as "Triple DES", was developed to increase the strength of the result over that available with DES. Triple DES uses three rounds of ciphering, with different keys for each of the rounds.

After twenty years, many believe that a new stronger, more flexible algorithm is needed. One way to make a cipher stronger is to increase the number of rounds of ciphering performed: with each successive transformation, the resulting encryption becomes more difficult to break. Another way to increase the strength is to increase the size of the key. Since the contents of the key remain secret, increasing the size adds another level of difficulty for anyone trying to deduce what transformations may have been performed on the original data, because they are unlikely to guess the random number combination making up the key. Yet another way to increase algorithm strength is to increase the size of the "block" on which the cipher performs its transformations. A block is the unit of original data processed during one ciphering operation. The larger the block size, the more difficult it becomes for an adversary to construct a dictionary of plaintext and matching ciphertext, for a given key, large enough to pose a threat to the security of the algorithm. Further, different keys can be used for each round, increasing the number of random number combinations that would have to be correctly guessed in order to break the cipher. These keys are referred to herein as "sub-keys".

It will be appreciated that when a cipher allows varying the number of rounds, the key size, the key values, and the block size at the same time, an incredibly difficult challenge is presented to a person attempting to discover the original data contents from an encrypted result. It will also be appreciated that the computations involved to cipher the data are quite complex, and that while performing more rounds of ciphering increases the strength of the result, it also causes computation time to increase. When data is very sensitive, this time spent in ciphering will be warranted. It may be, however, that less sensitive data does not warrant the added time and expense of many rounds of ciphering. By providing an algorithm where the number of rounds, the key size and values, and the block size are variable, the ultimate choice between the level of security required and the amount of computation time utilized rests with the user. By allowing the number of rounds, key size, and block size to vary, the cipher of the present invention becomes, in effect, scalable in three dimensions.

The existing DES and Triple DES algorithms use the secret key approach described above, but do not provide for variation in the key size, the block size, or the number of rounds of ciphering. As stated earlier, it is desired to have a more flexible, scalable algorithmic solution, that increases the strength of the result.

Accordingly, a need exists for an improved and more flexible cryptographic algorithm. More particularly, a need exists for a method and apparatus for an improved cryptographic algorithm that is block-oriented and uses a secret key. The cipher should use a variable length key, a variable length block, and a variable number of rounds. The cipher should provide for use of a different key during each round, and the key should be symmetric. The technique of the present invention achieves these objectives while using the simple operations of table lookup, exclusive OR, and key-dependent substitution, thereby minimizing the time required to encrypt and decrypt data. The data-independent sub-keys can be precomputed, further minimizing the time required for encryption and decryption. A minimal amount of computer storage is required for data used in the operation of the algorithm.

SUMMARY OF THE INVENTION

An object of the present invention is to provide a technique whereby data can be encrypted in such a manner as to make discovery of the underlying data contents, other than by use of the corresponding decryption technique, computationally infeasible.

Another object of the present invention is to provide a technique whereby encryption is accomplished with a strength better than that of existing DES and Triple DES solutions, with significantly improved efficiency.

Another object of the present invention is to provide a solution that does not use a significant amount of computer storage, in order to maximize the number of environments in which the solution can be used, including limited-storage devices such as those known as "Smart Cards".

Another object of the present invention is to provide a technique whereby decryption of the encrypted data restores the data to its original contents, in an efficient and error-free manner.

Another object of the present invention is to provide a solution that can be implemented in hardware or in software.

Another object of the present invention is to provide a solution that allows precomputing the sub-keys to be used for each round of ciphering, in order to minimize the time required for encrypting or decrypting an individual file or message.

Still another object of the present invention is to provide a technique whereby the cipher used for encryption and decryption is block-oriented, uses a symmetric key, and uses different sub-keys during each round of ciphering.

A further object of the present invention is to provide a technique whereby the cipher uses a variable number of rounds of processing during encryption and decryption, a variable length block of data as the unit to be encrypted and decrypted, and a variable length key. Allowing these factors to vary will provide the user with choices that will not only affect execution time and strength of security for any given use of the cipher, but will also allow variation between subsequent uses of the cipher, further increasing the difficulty of breaking encrypted data from a given source. The variation capability makes the cipher scalable in three dimensions, providing the user with flexibility to tune the algorithm to achieve the proper trade-off between execution time required and security achieved, in order to meet the needs of his particular application.

Yet another object of the present invention is to provide a technique whereby particular values for the variable information used by the algorithm—i.e., key length, block length, and number of rounds—are factored into the software or hardware implementation, as fixed values, in order to optimize performance.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a technique, system, and method for implementing a byte-oriented symmetric key block cipher supporting a variable length input key, a variable length block, and a variable number of rounds, comprising a subprocess for accessing and retrieving values in substitution boxes (s-boxes); a subprocess for generating sub-keys using this input key and these s-boxes; a subprocess for encrypting input data bytes (where these bytes are part of a block, and the block is part of an input data file) using the generated sub-keys and the s-boxes, producing encrypted data bytes (which are part of a corresponding encrypted block, which is part of an encrypted data file); and a subprocess for decrypting the encrypted data bytes using the sub-keys and s-boxes, resulting in restoration of the input data bytes.

The present invention will now be described with reference to the following drawings, in which like reference numbers denote the same element throughout.

BRIEF DESCRILMON OF THE DRAWINGS

Figure 5A:
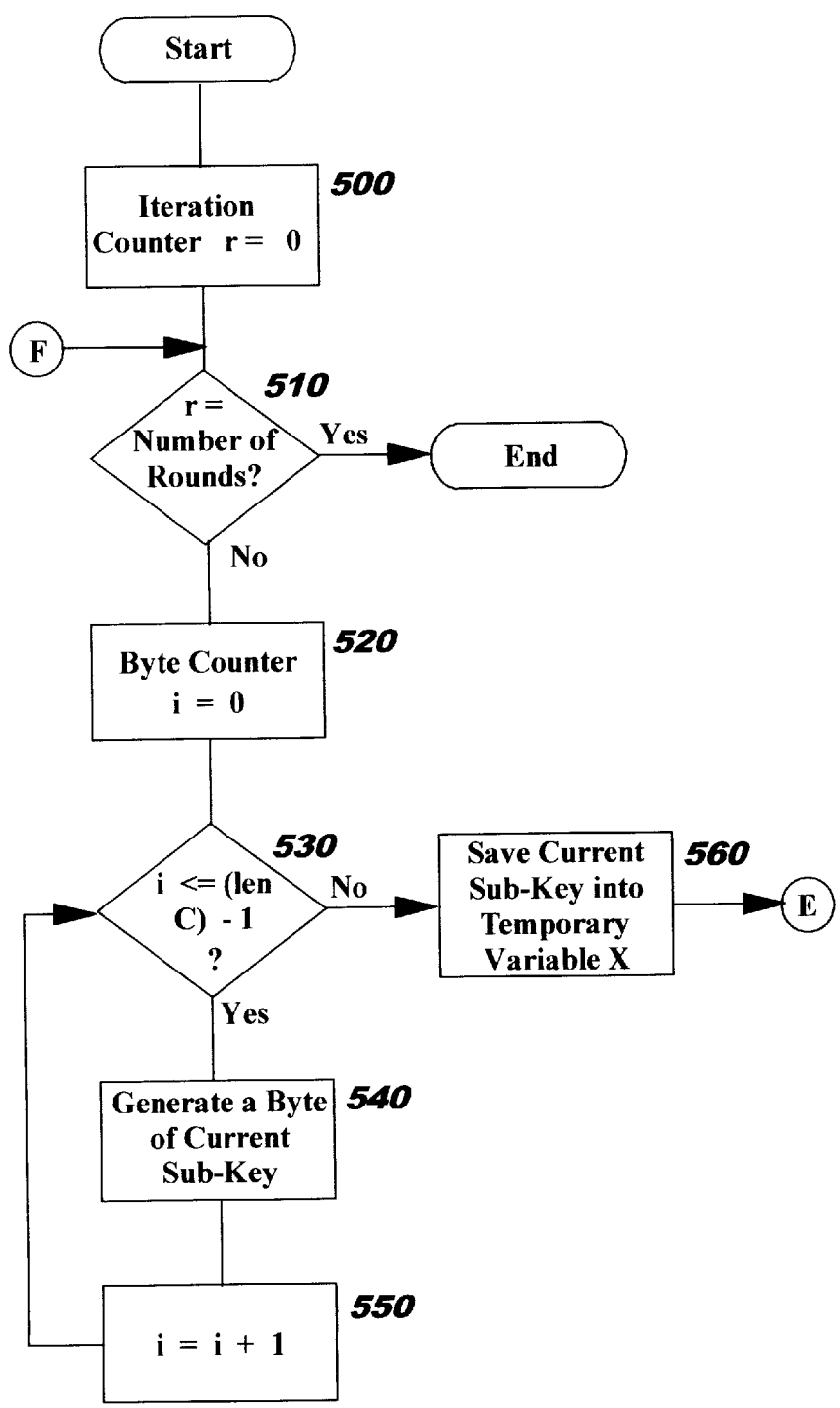
Figure 7:
Figure 7:

FIGS. 5A–B3 illustrate a flow chart which sets forth the logic used by the present invention to derive sub-keys from a key for each round of the cipher;

FIG. 6 shows an example of substitution boxes that may be used with the present invention; and FIG. 7 shows a small substitution box and its inverse substitution box, to illustrate the principle of inverting a substitution box.

DESCRIPTION OF THE PREFERRED EMBODIMENT

Figure 1:
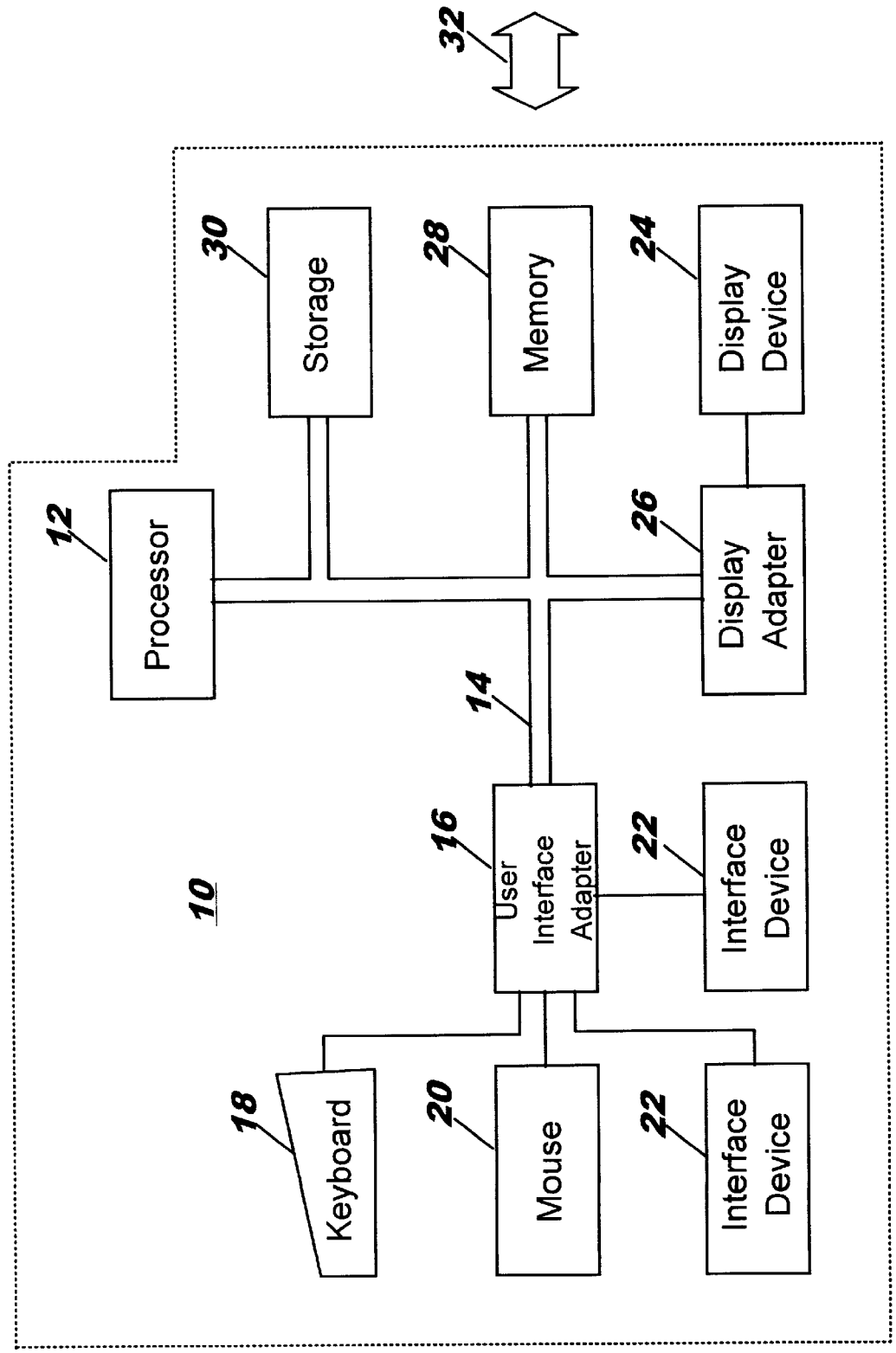
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 1, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and long term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, or the workstation 10 may operate as a stand-alone unit without communication to other workstations, etc. All of these configurations, as well as the appropriate communications hardware and software, are known in the art.

Figure 2:
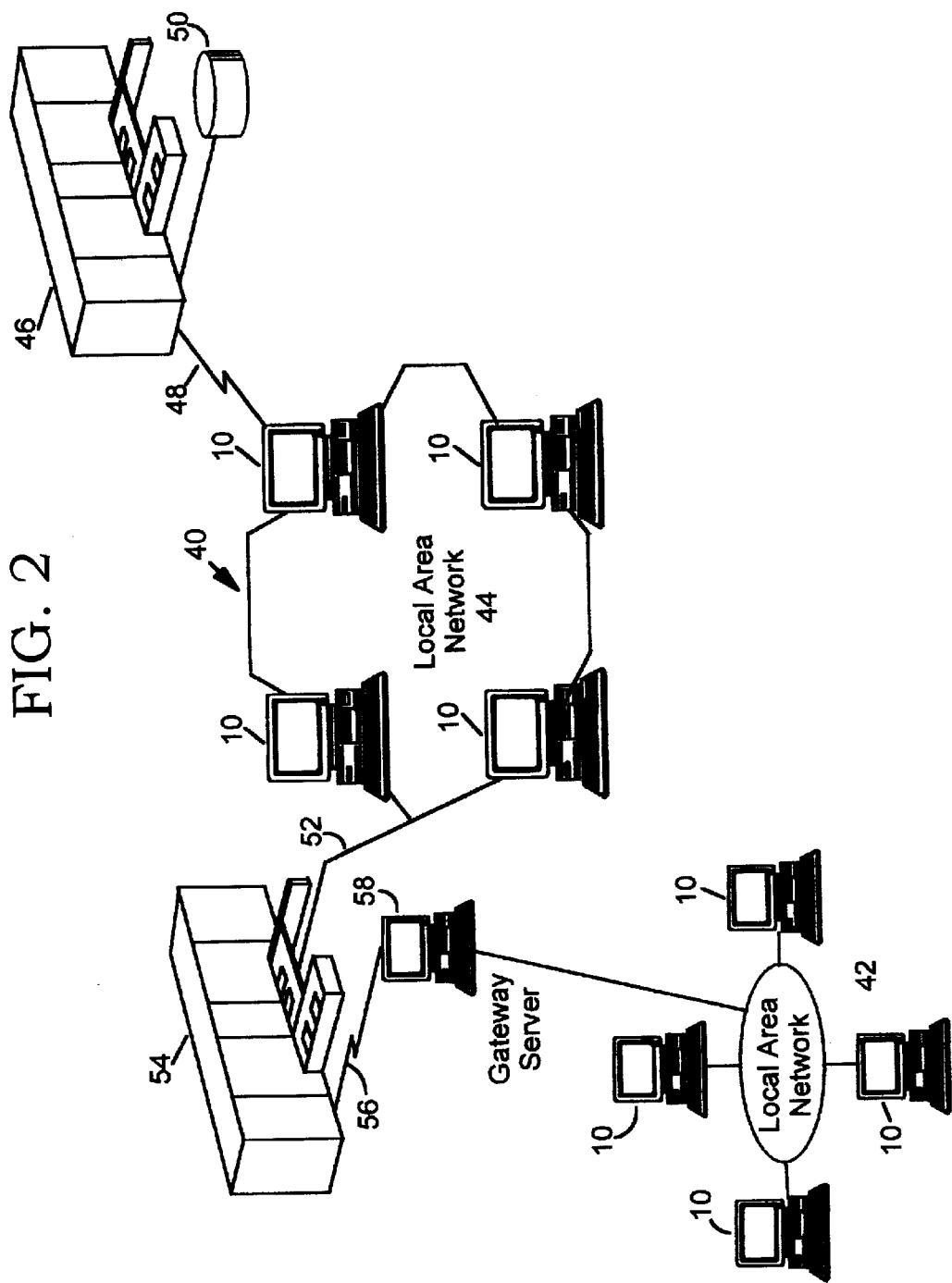
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

In a software solution, programming code which embodies the present invention is typically accessed by the microprocessor 12 of the workstation 10 from long term storage media of some type, such as a CD-ROM drive or hard drive, which is represented by the permanent storage 30 of the workstation 10. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The encrypted data resulting from use of the present invention may be stored in the storage 30, or may be sent from the workstation 10 to another computer or workstation of the network illustrated in FIG. 2 over the communications channel 32, for storage by that other computer or workstation.

In a hardware solution, the present invention may be embodied in the processor 12 of the workstation 10. Techniques for implementing logic functions in processors are well known in the art.

Preferred embodiments of the present invention will now be discussed with reference to FIGS. 3 through 7 and Table 1.

In the preferred embodiments, the present invention is implemented as a computer software program. This software performs the derivation of sub-keys from an input key for each round of the cipher, the encrypting of the data contents, and the decrypting of the data contents. The data may represent a message to be communicated over a network. The message may represent any of a number of types of information, such as conversational text sent as electronic mail, or a purchase request containing the buyer's credit card or account data. Alternatively, the data may be a conventional data file. Examples of this type of data include patient medical history, customer credit history, income tax and earnings data, and any conceivable stored information that needs to be protected from unintended disclosure. This type of data may be encrypted for transmission over a network, or it may be encrypted merely for secure storage. For ease of reference, the input data file or message will be referred to herein as an "input file".

The present invention encrypts and subsequently decrypts the data using a block-oriented cipher. The purpose of using a block-oriented cipher is to avoid having to synchronize the encryption and decryption processes. Stream ciphers (unlike block ciphers) require that the encryptor and decryptor be synchronized. The block-oriented cipher uses a symmetric key—that is, it uses the same key for encryption and for decryption. Thus, the key must be kept secret. This enables the algorithm to be publicly known and publicly available, while still protecting the data that has been enciphered. The cipher operates in a mode in which the algorithm uses the key and the result of its own earlier iterations to randomize the transformation of data. The concepts of block-oriented ciphers and symmetric keys are well known in the art.

The present invention also provides a technique for using variable block sizes, variable key sizes, and a variable number of rounds of cipher processing. The purpose of allowing these variables is to give the user of the cipher the flexibility to choose trade-offs between the increased computing time required (for example, as the number of processing rounds increases) and the strength of the resulting encryption.

Optionally, the present invention allows the software or hardware implementation of the cipher algorithm to be optimized for particular values of the variables. This is done by allowing a user of the cipher to enter values for block size, key size, and/or number of rounds before the final step of producing the cipher implementation. The final implementation then treats the values as being fixed, and is optimized for those fixed values.

The present invention accomplishes encryption of data using the steps of mixing, permutation, and key-dependent substitution for particular, defined groups of bytes of the block of data. A similar approach, with corresponding steps, is used for generating the sub-keys from the key for each round of the cipher. Decryption of data is accomplished in the present invention using the inverse of the data encryption, where the steps are key-dependent inverse substitution, inverse permutation, and inverse mixing. The terms "key-dependent inverse substitution", "inverse permutation", and "inverse mixing" mean that the processing performed in each of these decryption steps is the inverse of the processing performed in the corresponding encryption step. By performing inverse processing, in inverse order, the encrypted data is restored to its original content.

ENCRYPTION

FIRST ALTERNATIVE EMBODIMENT

Figure 3A:
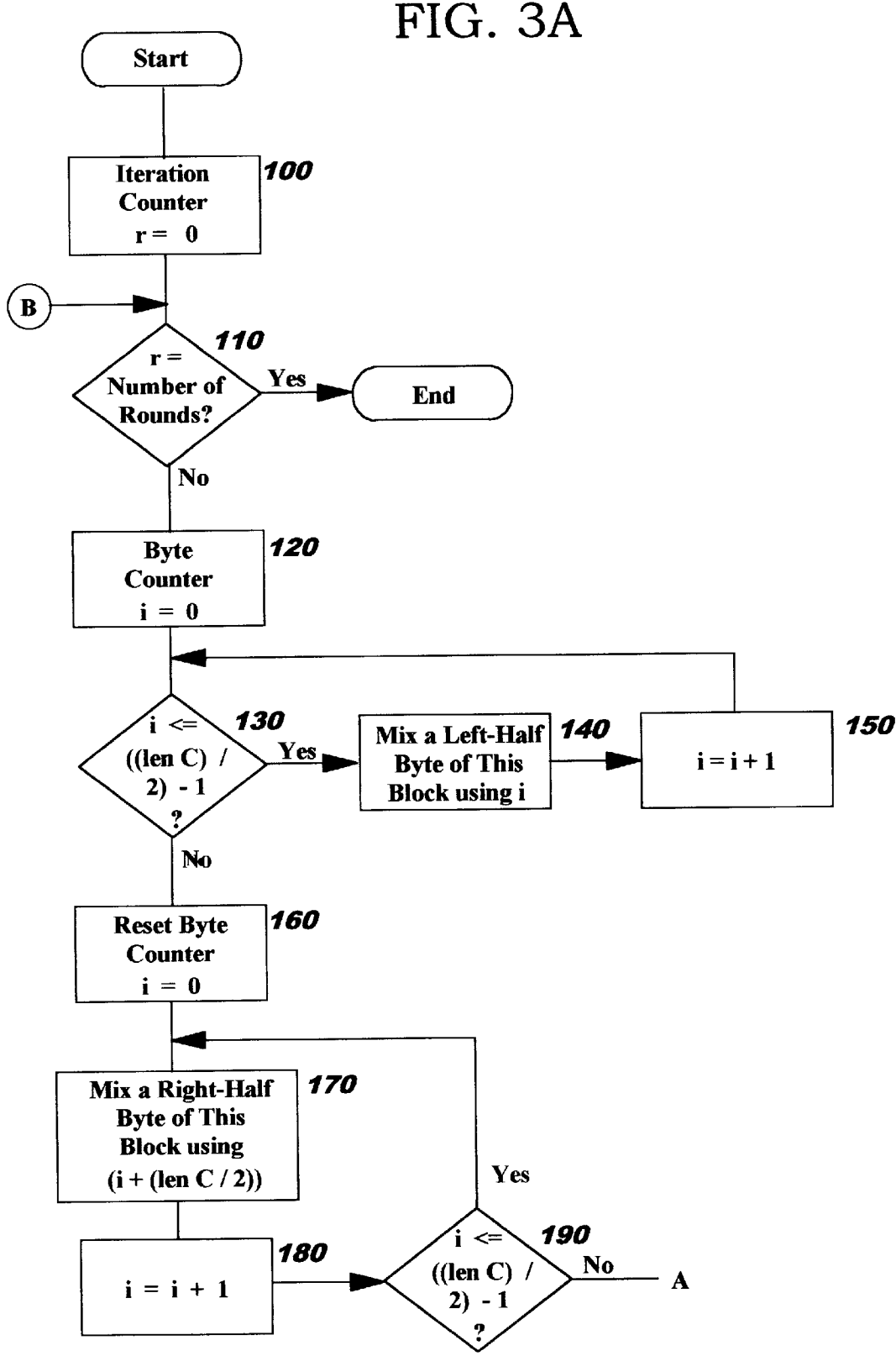
FIGS. 3A–3B illustrate a flow chart which sets forth the logic used by the present invention to encrypt a block of data.
Figure 3B:
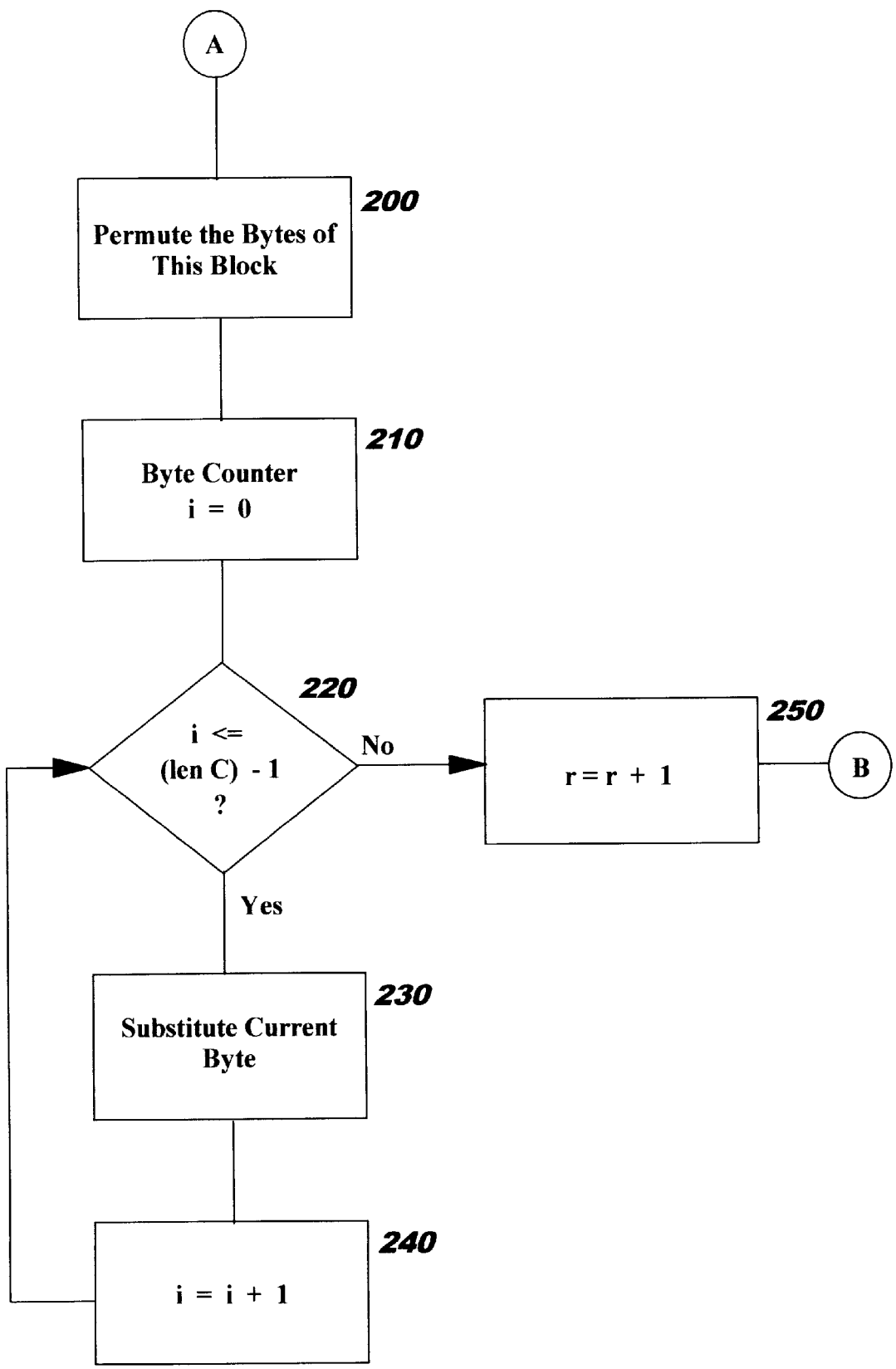

FIG. 3 illustrates the logical steps performed when a first alternative embodiment of the present invention is executed to encrypt a block of data. The process shown in this figure is repeated for each block of data in the input file.

Note that the process of FIG. 3 does not show the user entering particular values to be used for the variables (block size, key size, and number of rounds) defined for the cipher of the present invention, nor the value to be used for the key. The user will have been prompted to enter these values as configuration parameters of the cipher implementation. Or, if an optimized implementation of the cipher is being used, the user will have been prompted to enter values for block size, key size, and/or number of rounds before the final step of producing the implementation has completed. Techniques for entering values required by an implementation are well known in the art.

The first Step 100 is to initialize the iteration counter, "r", to keep track of how many rounds of cipher processing have been performed. At Step 110, a comparison is made between the iteration counter and the number of rounds of processing required. While the iteration counter is less than the number of rounds, the processing will continue on to Step 120. However, if the two values compared are equal, then encryption of the block has completed. It will be understood by one skilled in the art that the encryption process for each block of data forming the input file is identical, and that the process of FIG. 3 is used on each successive block until all blocks of the input file have been encrypted.

At Step 120, a byte counter ("i") is initialized. This counter is used to step through each byte of the block of data, performing appropriate transformations on that byte as defined by the current invention. In the preferred embodiments, the byte counter begins at zero, and the variable number of bytes (referred to herein as $\|C\|$, meaning "length of C" and shown in the figures as "(len C)", where C represents the block of data) of the block are numbered from zero through ($\|C\|-1$). Alternatively, the counter could begin at one, with the data bytes numbered from one through $\|C\|$. Techniques for numbering bytes of data, and counting and referring to those bytes, are well known in the art, as is the fact that zero-based versus one-based numbering has no effect on the outcome of the corresponding algorithm.

Step 130 tests to see if the byte counter points to a byte in the left half of the data block, or in the right half. The present invention performs different mixing transformations during the mixing step for the bytes in the left half than it does for the bytes in the right half. If the byte counter points to the left half of the data block, processing continues at Step 140 to perform the left-half mixing steps. If the byte counter points to the right half of the data block, processing continues at Step 160 to perform the right-half mixing steps.

The processing performed at Step 140 (the left-half mixing) is defined by the following mathematical equation:

$$newC_i = S^{\langle i \bmod 2 \rangle}_{C_i \otimes C_{i+\|C\|/2} \otimes C_{(i-1 \bmod \|C\|/2)+\|C\|/2}}$$

where $0 \le i \le (\|C\|/2) - 1$

It will be understood by one skilled in the art, referring to Table 1 for an explanation of symbols, that the equation for left-half mixing performs two exclusive OR operations, to determine an index to be used in retrieving a value from a substitution box. (For ease of reference, the substitution boxes will be referred to herein as "s-boxes", a term known by those skilled in the art.) The operands of the first exclusive OR operation are the byte of C pointed to by the current byte counter (the byte numbered "i"), and a corresponding byte from the right half of C (that is, the with byte of the right half). The operands of the second exclusive OR are the result from the first, and the with byte of the right half if the right half had been rotated one byte to the right. For example, if C is 8 bytes long, then the bytes of the left half are numbered 0, 1, 2, and 3; the bytes of the right half are numbered 4, 5, 6, and 7. The first exclusive OR, when i=0, uses bytes 0 and 4. Rotating the right half one byte to the right would effectively change the right half from 4, 5, 6, 7 into 7, 4, 5, 6. Thus, the second exclusive OR would use, for its second operand, byte 7. When i=2, the first operation would use bytes 2 and 6, and the second would use this result along with byte 5. The concept of rotating a group of bytes is well known in the art. Once the exclusive ORs have been performed, the result is used to index into one of the s-boxes. Indexing techniques are well known in the art, and will not be described further herein. The exclusive OR operation is also well known in the art, and will not be described further.

The preferred embodiments of the present invention contemplate use of two s-boxes. FIG. 6 shows two s-boxes that may be used with the present invention. The particular values shown in the s-boxes are provided merely as examples. The values can be rearranged with no effect on the functionality of the present invention. Different arrangements may impact the resulting strength of the cipher, however. The values shown were arrived at by randomly generating s-boxes, and then analyzing them for low differential and linear characteristics. This type of analysis is well known to those skilled in the art. Generating alternative s-boxes beyond those shown in FIG. 6 does not form a part of the present invention, and thus will not be further described.

Each of the two s-boxes shown in FIG. 6 is a one-dimensional array of non-repeating values between 0 and 255, indexed from 0 to 255. (The s-boxes each have 256 entries, so that indexing can be performed with an 8-bit number, where 8 bits is the length of the value resulting from the two exclusive OR operations. Note that the values are shown in FIG. 6 using their decimal representation.) Referring again to the left-half mixing equation, it will be seen that when the byte counter i is an even number, s-box zero is used; when i is an odd number, s-box one is used. For example, when i=2, then (i mod 2)=(2 mod 2), which evaluates to 0 and selects s-box zero; when i=5, then (i mod 2)=(5 mod 2), which evaluates to 1 and selects s-box one. The value retrieved from the s-box is substituted for the with byte of original data from the current block, resulting in a mixed byte.

It will be understood by one skilled in the art that the number of s-boxes can be increased, or decreased, from two. This would be used to further increase the strength, or the efficiency, of the cipher. Increasing the number of s-boxes would allow different boxes to be used at different points of ciphering (for example, one set of boxes for mixing and a different set for key-dependent substitution) or for different portions of the input block (for example, one set of boxes for mixing the left half, and a different set for mixing the right half). Decreasing the number of boxes requires increasing the size of the elements within the boxes. The functionality provided by 2 boxes having 256 entries, each 1 byte long, and accessed using a 1-byte index, can be achieved by alternatively providing 1 box with 65,536 entries, each 2 bytes long. This would decrease the number of accesses to the s-box by ½—in effect, grouping the retrievals by using an index 2 bytes long instead of 1 byte long. Further efficiencies can be achieved by making the entries longer than 2 bytes. For example, when the entries are 4 bytes long, the index values are 4 bytes long, so that the number of accesses is reduced by ¼ from the number required when using 1-byte entries. These alternative s-boxes having multi-byte entries and multi-byte indices may be formed from the s-boxes in FIG. 6, for example by combining each entry of one s-box with each entry of the other s-box, where the entry from the first s-box becomes the first byte of a two-byte entry, and the entry from the second s-box becomes the second byte.

Step 150 increments the byte counter i. Control then transfers back to Step 130.

At Step 160, the byte counter i is reset to 0, in order to perform the right-half mixing steps.

The processing performed at Step 170 (the right-half mixing) is defined by the following mathematical equation:

$$newC_{i+\|C\|/2} = S^{\langle i+\|C\|/2 mod 2\rangle}_{C_{i+\|C\|/2} \oplus newC_{i-1 mod \|C\|/2} \oplus newC_{i+2 mod \|C\|/2}}$$

where $0 \leq i \leq (\|C\|/2) - 1$

It will be understood by one skilled in the art that the equation for right-half mixing retrieves a value from an s-box, in the same manner used for left-half mixing. The only differences are where the operands come from that are used in the exclusive OR operations, and how the s-box to use is determined. The first exclusive OR still uses the current byte of C, but since the byte counter i has been reset to zero for pointing to each byte of the right half, a displacement value must first be added to it to determine the byte index into C. The displacement value is half the length of C, expressed as "$\|C\|/2$"—that is, a value that allows skipping over the left half bytes. For example, when $\|C\|=8$, the displacement value is 4. If the byte counter is 0, then the expression "$i+\|C\|/2$" evaluates to (0+4), so that the byte numbered 4 (the first byte of the right half of C) is the current byte. When the byte counter is 2, the expression "$i+\|C\|/2$" evaluates to (2+4), and the byte numbered 6 (the third byte of the right half) is the current byte. The second operand for the first exclusive OR is one of the newly-mixed bytes from the left half. The particular byte to use is located by effectively rotating the left half bytes by one byte to the right, then using the byte from this rotated left half that corresponds to the current byte from the right. (By "effectively rotating" it is meant that the bytes are treated as if they have been rotated. They are not actually moved from their current position.) For example, if the byte counter is 0, then the current byte from the right half is the first byte, numbered 4. The corresponding byte from the rotated left half will be the first byte, which was the byte numbered 3 before the rotation.

The operands of the second exclusive OR are the result from the first, and a different one of the newly-mixed bytes from the left half. The particular byte to be used as the second operand is located by effectively rotating the left half by two bytes to the left, then using the byte from this rotated left half that corresponds to the current byte from the right. For example, if $\|C\|=8$, the rotated left half will contain bytes which were numbered 2, 3, 0, 1. When the byte counter is 0, then the corresponding byte from the rotated left half will be the byte that was numbered 2 before the rotation.

The expression "$i+\|C\|/2 \bmod 2$" is used to determine which s-box to use in order to retrieve the new value to be used for $newC_{i+\|C\|/2}$. If both operands i and $\|C\|/2$ are even or odd, their sum will be even, so that s-box 0 will be used. If one operand is even and the other is odd, their sum will be odd, so that s-box 1 will be used. For example, if i=0 and $\|C\|=8$, then (i+$\|C\|/2$ mod 2)=((0+4) mod 2)=(4 mod 2)=0; if i=3 and $\|C\|+8$, then (i+$\|C\|/2$ mod 2)=((3+4) mod 2)=(7 mod 2)=1.

Control transfers to Step 180 after the right-half mixing operation has been performed on the current byte. At Step 180, the byte counter i is incremented. Step 190 tests to determine, based on the byte counter, whether all the bytes of the right half have now undergone the mixing operation. If the test at Step 190 has a positive answer, then there are still more bytes to process, and control transfers back to Step 170. If the test at Step 190 has a negative answer, then all bytes of the block have been mixed, and control transfers to Step 200.

At Step 200, the permutation operation is performed. This operation is represented by the following mathematical equation:

$$C_i \leftarrow \rightarrow C_{i+\|C\|/2} \text{ where } 0 \leq i < (\|C\|/2) - 1$$

It will be understood by one skilled in the art, referring to Table 1 for an explanation of symbols, that this permutation operation consists of swapping each byte of the left half of the block of data with the corresponding byte of the right half of the block. Note that it is the mixed bytes that are being swapped: the original data bytes are never re-used once the byte has been mixed.

Following the permutation operation, Step 210 re-initializes the byte counter i for use in the final operation, the key-dependent substitution. Step 220 compares the value of the byte counter to see whether all the bytes have been substituted. If the test at Step 220 has a positive answer, then there are still more bytes to process, and control transfers to Step 230. If the test at Step 220 has a negative answer, then all bytes of the block have been substituted, and control transfers to Step 250.

Step 230 performs a key-dependent substitution operation on the current byte of data in the block. The substitution operation is represented by the following mathematical equation:

$$newC_i = S_{K_i^{(r)} \oplus C_i}^{\langle imod2 \rangle} \text{ where } 0 \le i \le \|C\|$$

It will be understood by one skilled in the art, with reference to Table 1 for an explanation of symbols, that this substitution operation uses a byte of a sub-key, and exclusive ORs that byte with one of the data bytes of the permuted block. The present invention uses a different sub-key for each round of ciphering, where the sub-key number is identical to the iteration counter ("r") used for counting the rounds of ciphering. (Computation of the sub-keys is explained later herein, with reference to FIG. 5.) The byte counter ("i") used in this substitution step determines which byte of the current sub-key is used for the first operand of the exclusive OR operation, and it also determines which byte of the permuted block is used for the second operand of the operation. For example, when the byte counter is 0, the byte numbered 0 from the current sub-key is used, as is the byte numbered 0 from the block. The 8-bit value resulting from the exclusive OR operation is used as an index to retrieve a value from one of the s-boxes. When performing the substitution step for an even-numbered byte of the data block, values are retrieved from s-box zero. When performing the substitution step for an odd-numbered byte of the data block, values are retrieved from s-box one. The retrieved value is then used as the new value of the current byte ("newC$_i$") of the enciphered block.

After substituting the current byte, Step 250 increments the value of the byte counter. Control then transfers back to Step 220, to determine whether all bytes of the block have been substituted.

When control reaches Step 250, a new value has been substituted for each byte of the block, and the current round of ciphering is complete. The iteration counter r is then incremented, and control transfers back to Step 110, to determine whether the desired number of rounds, or processing iterations, are complete.

SECOND ALTERNATIVE EMBODIMENT

In a second alternative embodiment, instead of performing the mixing operation on each byte separately, mixing can be done on groups of bytes (e.g., where the group is half the size of the block). This will improve the operational efficiency of the algorithm because fewer individual operations are required. The following compact mathematical equations define the operation of this alternative embodiment:

$$LC' = LC \oplus RC \oplus (RC >> 8)$$

$$newLC_i = S_{LC_i'}^{\langle imod2 \rangle} \text{ where } 0 \le i \le (\|C\|/2) - 1$$

$$RC' = RC \oplus (newLC >> 8) \oplus (newLC << 16)$$

$$newRC_i = S_{RC_i'}^{\langle i + \|C\|/2 mod2 \rangle} \text{ where } 0 \le i \le (\|C\|/2) - 1$$

The first of these four equations explains how the new left half LC' of the block is created. Three steps are involved. First, an exclusive OR operation is performed, where the first operand is the original contents of the left half and the second operand is the original contents of the right half. Next, the original contents of the right half are effectively rotated 8 bits to the right. Finally, a second exclusive OR operation is performed, where the first operand is the result of the first exclusive OR, and the second operand is the rotated right half. As an example, if the block is 8 bytes long, the bytes of the left half are numbered 0, 1, 2, 3 and the bytes of the right half are numbered 4, 5, 6, 7. The first operation uses bytes 0, 1, 2, and 3 as a group for the first operand, and bytes 4, 5, 6, and 7 as a group for the second operand. The rotation of the right half rearranges the bytes to 7, 4, 5, 6, which is then the second operand of the second exclusive OR.

In the second equation, the bytes LC$_i$' of this newly-created left half are used, one at a time, to index into the s-boxes. (If the length of the entries in the s-boxes is increased to more than one byte, as discussed previously, then the boxes are indexed with groups of bytes at one time, instead of one byte at a time.) Each byte is used as the index into s-box zero or one, as explained before in describing the first alternative embodiment, depending on whether this is an even-numbered or odd-numbered byte. The value located in the s-box is then used as the new value for the byte newLC$_i$ in the newly-created left half. Thus, the substitution operates as it did in the mixing steps of the first alternative embodiment. The result of the left-half substitution is referred to as newLC.

The third of these equations explains how the new right half RC' of the block is created. Four steps are involved. First, the contents of the newly-created left half are effectively rotated 8 bits to the right. Second, an exclusive OR operation is performed, where the first operand is the original contents of the right half and the second operand is this rotated left half. Third, the newly-created left half is effectively rotated 16 bits to the left. Finally, a second exclusive OR operation is performed, where the first operand is the result of the first exclusive OR, and the second operand is the rotated left half.

In the fourth equation, the bytes RC$_i$' of this newly-created right half are used, one at a time, to index into the s-boxes. Each byte is used as the index into s-box zero or one, as before, depending on whether this is an even-numbered or odd-numbered byte. The value located in the s-box is then used as the new value for the byte newRC$_i$ in the newly-created right half. The result of the right-half substitution is referred to as newRC.

An alternative embodiment may also be used for the permutation operation. This alternative embodiment operates on groups of bytes which are, for example, half the length of the block, according to the following compact mathematical algorithm:

$$LC \leftarrow \rightarrow RC$$

This algorithm indicates that the bytes from the left half of the block are swapped with the bytes from the right half of the block in a single operation. Note that these bytes are not the original bytes of the input block, but are the bytes resulting from the mixing operation.

An alternative embodiment is also defined for the key-dependent substitution operation to improve the operational efficiency of the algorithm. The alternative embodiment is shown in the following compact mathematical equations:

$$C' = K^{<r>} \oplus C$$

$$newC_i = S_{C'_i}^{\langle i \bmod 2 \rangle} \text{ where } 0 \leq i \leq \|C\| - 1$$

In the first of these equations, new values for all the bytes of the block C' are recalculated in one exclusive OR operation. The first operand is the current sub-key (that is, the rth sub-key, where this is round number r of encrypting the block). The second operand is the block, C, as it exists after the preceding mixing and permutation steps have finished.

In the second equation, the bytes $C_i'$ of the newly-created block are used, one at a time, to index into the s-boxes. Each byte is used as the index into s-box zero or one, as before, depending on whether this is an even-numbered or odd-numbered byte. The value located in the s-box is then used to replace the byte $newC_i$ in the block. Thus, the substitution operates as it did in the key-dependent substitution steps of the first alternative embodiment. The result of the key-dependent substitution is an encrypted block. More rounds of the mixing, permutation, and key-dependent substitution operations may be performed, where the number of rounds of these operations is chosen by the user.

THIRD ALTERNATIVE EMBODIMENT

In yet another embodiment, the compact form of mixing (that is, mixing groups of bytes instead of mixing individual bytes) can be combined with the compact form of permutation. This further reduces the number of operations required. The following mathematical equations define this embodiment:

$$RC' = LC \oplus RC \oplus (RC >> 8)$$

$$newRC_i = S_{RC'_i}^{\langle i \bmod 2 \rangle} \text{ where } 0 \leq i \leq (\|C\|/2) - 1$$

$$LC' = RC \oplus (new\ RC >> 8) \oplus (newRC << 16)$$

$$newLC_i = S_{LC'_i}^{\langle (i + \|C\|/2) \bmod 2 \rangle} \text{ where } 0 \leq i \leq (\|C\|/2) - 1$$

The first of these four equations explains how the new right half RC' of the block is created. Three steps are involved. First, an exclusive OR operation is performed, where the first operand is the original contents of the left half and the second operand is the original contents of the right half. Next, the original contents of the right half are effectively rotated 8 bits to the right. Finally, a second exclusive OR operation is performed, where the first operand is the result of the first exclusive OR, and the second operand is the rotated right half. As an example, if the block is 8 bytes long, the bytes of the left half are numbered 0, 1, 2, 3 and the bytes of the right half are numbered 4, 5, 6, 7. The first operation uses bytes 0, 1, 2, and 3 as a group for the first operand, and bytes 4, 5, 6, and 7 as a group for the second operand. The rotation of the right half rearranges the bytes to 7, 4, 5, 6, which is then the second operand of the second exclusive OR.

In the second equation, the bytes $RC_i'$ of this newly-created right half are used, one at a time, to index into the s-boxes. (If the length of the entries in the s-boxes is increased to more than one byte, as discussed previously, then the boxes are indexed with groups of bytes at one time, instead of one byte at a time.) Each byte is used as the index into s-box zero or one, as explained before in describing the first alternative embodiment, depending on whether this is an even-numbered or odd-numbered byte. The value located in the s-box is then used as the new value for the byte $newRC_i$ in the newly-created right half. The result of the right-half substitution is referred to as newRC.

The third of these equations explains how the new left half LC' of the block is created. Four steps are involved. First, the contents of the newly-created right half are effectively rotated 8 bits to the right. Second, an exclusive OR operation is performed, where the first operand is the original contents of the right half and the second operand is this rotated right half. Third, the newly-created right half is effectively rotated 16 bits to the left. Finally, a second exclusive OR operation is performed, where the first operand is the result of the first exclusive OR, and the second operand is the rotated right half.

In the fourth equation, the bytes $LC_i'$ of this newly-created left half are used, one at a time, to index into the s-boxes. Each byte is used as the index into s-box zero or one, as before, depending on whether this is an even-numbered or odd-numbered byte. The value located in the s-box is then used as the new value for the byte $newLC_i$ in the newly-created left half. The result of the left-half substitution is referred to as newLC.

While these equations have been defined using the bytes of the left half of the block as one group, and the bytes of the right half as another block, other groupings are possible without deviating from the inventive concepts of the present invention. For example, the even-numbered bytes may be treated as one group, and the odd-numbered bytes as another group. Or, more than two groups may be used. For example, each half of the block could be further divided, treating the block as four groups of bytes. It will be obvious to one skilled in the art that the groupings used in the decryption algorithms must correspond to those used in the encryption algorithms.

DECRYPTION

FIRST ALTERNATIVE EMBODIMENT

Figure 4A:
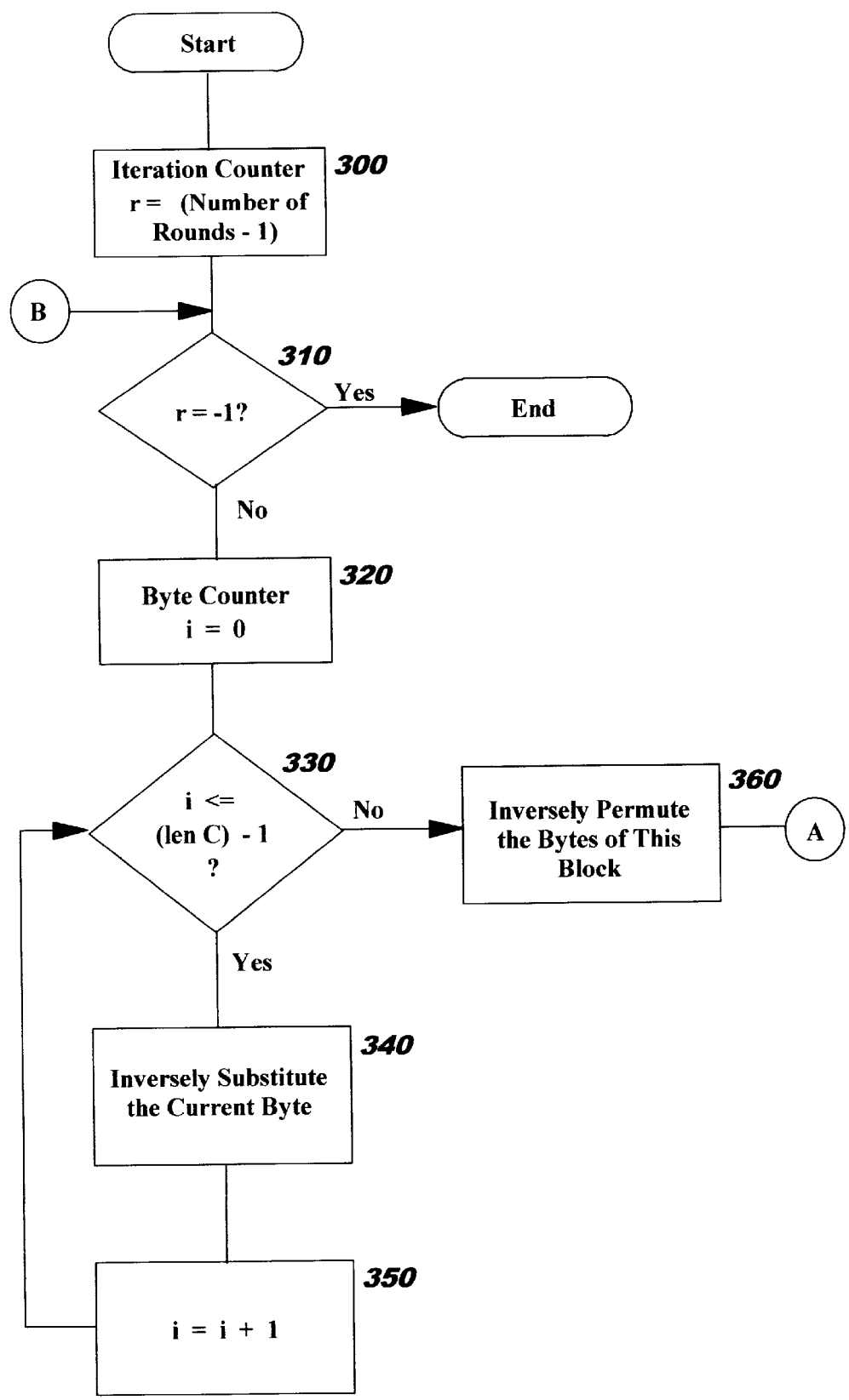
FIGS. 4A–4B illustrate a flow chart which sets forth the logic used by the present invention to decrypt a block of data.
Figure 4B:
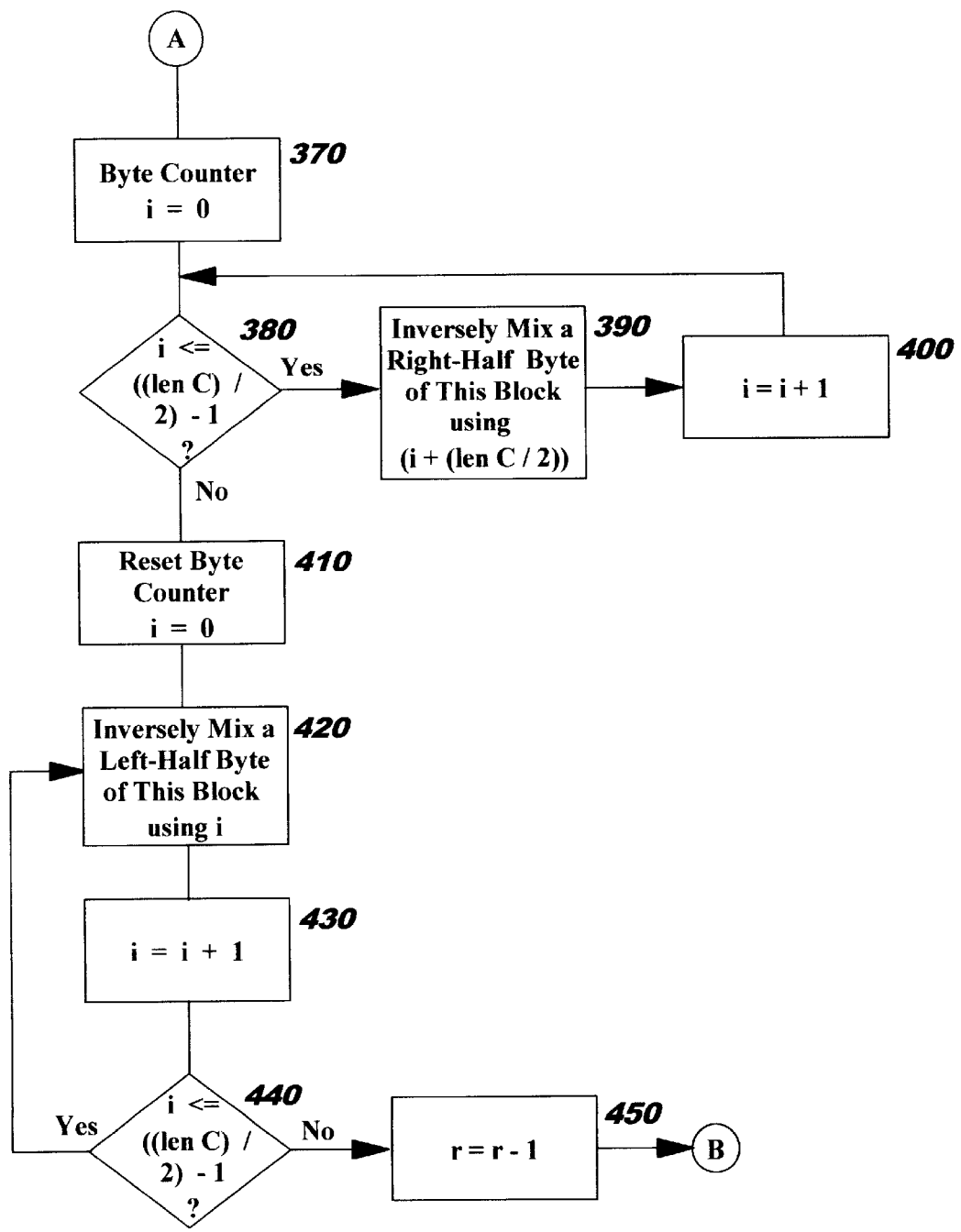

Returning to the first alternative embodiment, FIG. 4 illustrates use of the present invention to perform decryption of data which has previously been encrypted using the process of FIG. 3. It will be recognized by one skilled in the art that the decryption process performs inverse operations, in inverse order, of the encryption process. Thus, the original content of the encrypted data file is restored by using the decryption process on each block of the file.

In describing the decryption process, the block to be decrypted is referred to as C. Note that this is not the same block C that was input to the encryption process: it is instead the output of the encryption process.

The decryption process begins at Step 300 by initializing the iteration counter r, to keep track of the number of rounds of deciphering. At Step 310, the iteration counter is compared to see whether all the rounds have been completed. While the iteration counter is not less than zero, processing continues on to Step 320. If the iteration counter is −1, however, then decryption of the block has completed. It will be understood by one skilled in the art that the decryption process for each block of data forming the input file is identical, and that the process of FIG. 4 is used on each successive block until all blocks of the input file have been decrypted.

At Step 320, the byte counter i is initialized to 0. At Step 330, the byte counter is compared to see whether all the bytes have been inversely substituted. If the test at Step 330 has a positive answer, then there are still more bytes to process, and control transfers to Step 340. If the test at Step 330 has a negative answer, then all bytes of the block have been inversely substituted, and control transfers to Step 360.

The key-dependent inverse substitution operation performed at Step 340 is defined by the following mathematical equation:

$$newC_i = K_i^{(r)} \oplus S_{C_i}^{-(i mod 2)} \text{ where } 0 \le i \le \|C\|$$

This operation consists of performing a single exclusive OR for each byte of the block, where the first operand is the current byte of the current sub-key. The iteration counter "r" identifies the current sub-key. The byte counter "i" points to the current byte of this sub-key, as well as to the current byte of the block. The second operand is located by retrieving a value from the inverse of one of the s-boxes. The index into the inverse s-box is the current byte of the block, $C_i$. The expression "−<i mod 2>" determines which inverse s-box is to be used. When the byte counter is even, (i mod 2) will evaluate to 0, so the inverse s-box numbered 0 is used; when the byte counter is odd, (i mod 2) will evaluate to 1, so the inverse s-box numbered 1 is used.

An inverse s-box is created by inverting the relationship between the indices and the entries of the original s-box. FIG. 7 shows a small sample s-box, and its inverse, to illustrate this principle. In this sample s-box, the values chosen for the entries were randomly arranged, as are the entries of the 256-entry substitution boxes of the invention. In this sample s-box, index 1 retrieves the value 3, as shown in FIG. 7. To invert this retrieval operation, the inverse s-box must result in retrieval of the value 1 using the index 3. In other words, the value 1 is changed into the value 3, and then back into the value 1, by using this sample s-box during encryption, and its inverse s-box during decryption.

Step 350 increments the byte counter to point to the next byte of the current block. Control then transfers back to Step 330.

After the key-dependent inverse substitution has been performed on each byte of C, control will transfer from Step 330 to Step 360. Step 360 is the inverse permutation operation, which is defined by the following mathematical equation:

$$C_i \leftarrow\rightarrow C_{i+\|C\|/2} \text{ where } 0 \le i \le (\|C\|/2)-1$$

The inverse permutation operation swaps each byte of the left half of the block with the corresponding byte of the right half This operation is identical to the permutation used for encryption, and has the effect of putting the bytes back into the half from which they were swapped during encryption.

After the inverse permutation operation is complete, Step 370 re-initializes the byte counter i to 0, for use with the inverse mixing steps. Step 380 tests to see whether the byte counter points to a byte in the left half of the block, or a byte in the right half. Processing for right-half bytes begins at Step 390, and processing for left-half bytes begins at Step 410.

In the encryption process, the left-half bytes were mixed first, followed by the right-half bytes. To invert this process, the order of mixing must also invert, so that the right half is now processed first. The inverse mixing operation for right-half bytes performed at Step 390 is defined by the following mathematical equation:

$$newC_{i+\|C\|/2} = S_{C_{i+\|C\|/2}}^{-\langle(i+\|C\|/2)mod2\rangle} \oplus C_{(i-1)mod\|C\|/2} \oplus C_{(i+2)mod\|C\|/2}$$

where $0 \le i \le (\|C\|/2) - 1$

This operation creates new values for each byte $newC_{i+\|C\|/2}$ in the right half of the block, one at a time. An index is used to point to the current byte of the right halt and is computed by adding the current byte counter, i, to a value $\|C\|/2$, which is a value sufficient to skip over the bytes of the left half. Two exclusive OR operations are performed to create the new value for each byte. In the first exclusive OR, the first operand is a value retrieved from an inverse s-box. The index into the inverse s-box is the value of the current byte $C_{i+\|C\|/2}$ from the right half of the block. When both the byte counter i and the expression $\|C\|/2$ are either even or odd, the expression "(i+$\|C\|$/2) mod 2" results in the inverse s-box numbered 0 being used; when only one of the byte counter or the expression $\|C\|/2$ is odd, the inverse s-box numbered 1 is used. The second operand of this first exclusive OR is a byte from the left half of the block. The particular byte is represented by the expression "(i−1) mod $\|C\|/2$". This expression selects a left-half byte that corresponds to the current displacement into the right half plus a further displacement by effectively rotating one byte to the right within the left half For example, when the byte counter i is 0, the first byte of the right half is the current byte. If the block is 8 bytes in length, the first byte of the right half is the byte numbered 4 (using zero-based counting). The first byte from the left would be used except for the further displacement consisting of the right rotation of the left half. The bytes of the left half are numbered 0, 1, 2, 3 before the rotation, and 3, 0, 1, 2 after the rotation. Thus, the first byte of the rotated group is the byte which was numbered 3 before the rotation. If the byte counter i is 2 and $\|C\|$ is 8, the first operand is the byte numbered 6 (the third byte in the right half), and the second operand is the byte numbered 1 before the rotation (the third byte in the rotated left half).

The result of this first exclusive OR operation becomes the first operand of the second exclusive OR. The second operand is again a byte from the left half of the block. The particular byte is indicated by the expression "(i+2) mod $\|C\|/2$". This expression selects a left-half byte that corresponds to the current displacement into the right half, plus a further displacement by effectively rotating two bytes to the left within the left half. For example, when the block length is 8, the rotated left half becomes 2, 3, 0, 1. If the byte counter i is 0, the expression ((i+2) mod $\|C\|/2$) becomes ((0+2) mod 4), which evaluates to 2, indicating that the byte numbered 2 before the rotation (the first byte in the rotated left half) is used; when the byte counter is 2, the expression becomes ((2+2) mod 4), which evaluates to 0, indicating that the byte numbered 0 before the rotation (the third byte in the rotated left half) is used.

When these two exclusive OR operations have been performed, the resulting value becomes the new value for the byte numbered (i+$\|C\|/2$), referred to as $newC_{i+\|C\|/2}$, in the right half of the block.

The byte counter is incremented at Step 400. Control then transfers back to Step 380, to determine if there are more bytes to be inversely mixed in the right half.

In order to inversely mix the bytes of the left half, the byte counter is reset to 0 at Step 410. Control then transfers to Step 420, where the current byte from the left half is inversely mixed. The inverse mixing operation for left-half bytes performed at Step 420 is defined by the following mathematical equation:

$$newC_i = S_{C_i}^{-\langle imod2\rangle} \oplus newC_{i+\|C\|/2} \oplus newC_{(i-1mod\|C\|/2)+\|C\|/2}$$

$$\text{where } 0 \le i \le (\|C\|/2) - 1$$

This operation creates new values for each byte $newC_i$ in the left half of the block, one at a time. The byte counter i points to the current byte of the left half. Two exclusive OR operations are performed to create the new value for each byte. In the first exclusive OR, the first operand is a value retrieved from an inverse s-box. The index into the inverse s-box is the current byte $C_i$ from the left half of the block. When the byte counter is even, the expression "i mod 2" evaluates to 0, and the inverse s-box numbered 0 is used; when the byte counter is odd, the expression "i mod 2" evaluates to 1, and the inverse s-box numbered 1 is used. The second operand of this first exclusive OR is a byte from the newly-created right half of the block. The particular byte is represented by the expression "i+‖C‖/2". This expression selects a right-half byte that corresponds to the current byte counter, used as a displacement into the right half. For example, when the byte counter i is 0, the byte numbered 0 from the left half (the first byte of the left half) is being inversely mixed. If the block is 8 bytes in length, the expression "i+‖C‖/2" becomes (0+4), so that the byte numbered 4 (which is the first byte of the right half) is used. If the byte counter is 2, the byte numbered 2 from the left half (the third byte of the left half) is used. The expression "i+‖C‖/2" becomes (2+4), so that the byte numbered 6 (which is the third byte of the right half) is used.

The result of this first exclusive OR operation becomes the first operand of the second exclusive OR. The second operand is again a byte from the newly-created right half of the block. The particular byte is indicated by the expression "((i−1) mod ‖C‖/2)+‖C‖/2". This expression selects a right-half byte that corresponds to the current displacement into the left half, plus a further displacement by effectively rotating one byte to the right within the right half. For example, when the byte counter i is 0, the first byte of the left half is the current byte. If the block is 8 bytes in length, the first byte of the left half is the byte numbered 0 (using zero-based counting). The first byte from the right would be used except for the further displacement consisting of the right rotation of the right half. The bytes of the right half are numbered 4, 5, 6, 7 before the rotation, and 7, 4, 5, 6 after the rotation. Thus, the first byte of the rotated group is the byte which was numbered 7 before the rotation. This can be seen by evaluating the expression (((i−1) mod ‖C‖/2)+‖C‖/2), which is (((0−1) mod 4)=4)=((7 mod 4)=(2+4)=7. If the byte counter i is 2, the second operand is the byte numbered 5 before the rotation (the third byte in the rotated right half). In this latter case, the expression (((i−1) mod ‖C‖/2)+‖C‖/2) is evaluated as (((2−1) mod 4)+4)=((1 mod 4)+4)=(1+4)=5.

When these two exclusive OR operations have been performed, the resulting value becomes the new value for the with byte of the left half of the block.

The byte counter is incremented at Step 430. Step 440 tests to see whether the byte counter still points to a byte in the left half. If this test has a positive result, control transfers back to Step 420 to perform the inverse mixing operation on this next byte of the left half. If this test has a negative result, then this round of inverse key-dependent substitution, inverse permutation, and inverse mixing has completed, and control transfers to Step 450.

Step 450 decrements the iteration counter r. Control then transfers back to Step 310, to determine if the required number of rounds of deciphering are complete.

SECOND ALTERNATIVE EMBODIMENT

A second alternative embodiment for decryption may be used, where the steps are again inverse key-dependent substitution, inverse permutation, and inverse mixing. Groups of bytes are used in the operations, however, instead of one byte at a time. This second alternative embodiment corresponds to the second alternative embodiment for encryption.

The alternative embodiment of the inverse key-dependent substitution is shown in the following compact mathematical equations:

$$C'_i = S_{C_i}^{-\langle imod2\rangle}$$

$$newC = K^{<r>} \oplus C'$$

In the first of these equations, the bytes $C_i$ of the encrypted block are used, one at a time, to index into the inverse s-boxes. Each byte is used as the index into inverse s-box zero or one, as before, depending on whether this is an even-numbered or odd-numbered byte. The value located in the inverse s-box is then used as the new value for the byte $C'_i$ of the block.

In the second equation, new values for all the bytes of the block are recalculated in one exclusive OR operation, and stored as newC. The first operand is the current sub-key, identified by the iteration counter r. The second operand is the block resulting from the first equation, referred to as C'.

An alternative embodiment for decryption is also defined for the inverse permutation operation, which operates on groups of bytes which are, for example, half the length of the block, according to the following compact mathematical algorithm:

$$LC \leftarrow \rightarrow RC$$

This algorithm indicates that the bytes from the left half of the block are swapped with the bytes from the right half of the block in a single operation. Note that these bytes are not the original bytes of the input encrypted block, but are the bytes resulting from the inverse key-dependent substitution operation.

An alternative embodiment of the inverse mixing can also be performed, using groups of bytes instead of one byte at a time. Each group of bytes may be half the length of the block, so that the left-half bytes are again treated separately from the right-half bytes. (Alternatively, different sized groups of bytes, or bytes chosen according to some other strategy than left-half and right-half, may be used. For example, the left and right halves could each be broken into two groups. The groupings used in the decryption algorithms must correspond to those used in the encryption algorithms.) The mathematical equations representing the operations on the groups of bytes are:

$$RC'_i = S_{RC_i}^{-\langle(i+\|C\|/2)mod2\rangle} \text{ where } 0 \le i \le (\|C\|/2) - 1$$

$$newRC = RC' \oplus (LC >> 8) \oplus (LC << 16)$$

$$LC'_i = S_{LC_i}^{-\langle imod2\rangle} \text{ where } 0 \le i \le (\|C\|/2) - 1$$

$$newLC = LC' \oplus newRC \oplus (newRC >> 8)$$

The first of these equations explains how the bytes $RC_i$ of the right half (after the inverse key-dependent substitution and inverse permutation) are used, one at a time, to index into the inverse s-boxes. (If the length of the entries in the s-boxes is increased to more than one byte, as discussed previously, then the boxes are indexed with groups of bytes at one time, instead of one byte at a time.) Each byte is used as the index into inverse s-box zero or one, as before, depending on whether this is an even-numbered or odd-numbered byte. The value located in the inverse s-box is then used as the new value for the byte $RC_i'$ in the right half. The result of the right-half substitution is referred to as RC'.

In the second equation, the new right half newRC of the block is created. Four steps are involved. First, the contents of the left half are effectively rotated 8 bits to the right. Second, an exclusive OR operation is performed, where the first operand is the right half resulting from the first equation, and the second operand is this rotated left half. Third, the left half is effectively rotated 16 bits to the left. Finally, a second exclusive OR operation is performed, where the first operand is the result of the first exclusive OR, and the second operand is the rotated left half.

The third of these four equations explains how the bytes $LC_i'$ of the left half are used, one at a time, to index into the inverse s-boxes. Each byte is used as the index into inverse s-box zero or one, as explained before depending on whether this is an even-numbered or odd-numbered byte. The value located in the inverse s-box is then used as the new value for the byte $LC_i'$ in the left half The result of the left-half substitution is referred to as LC'.

In the fourth equation, the new left half newLC of the block is created. Three steps are involved. First, an exclusive OR operation is performed, where the first operand is the left half resulting from the third equation, and the second operand is the newly-created right half. Next, the newly-created right half is effectively rotated 8 bits to the right. Finally, a second exclusive OR operation is performed, where the first operand is the result of the first exclusive OR, and the second operand is the rotated right half As an example, if the block is 8 bytes long, the bytes of the left half are numbered 0, 1, 2, 3 and the bytes of the right half are numbered 4, 5, 6, 7. The first operation uses bytes 0, 1, 2, and 3 as a group for the first operand, and bytes 4, 5, 6, and 7 as a group for the second operand. The rotation of the right half rearranges the bytes to 7, 4, 5, 6, which is then the second operand of the second exclusive OR.

THIRD ALTERNATIVE EMBODIMENT

In yet another alternative embodiment for decryption, the inverse of the permutation and mixing steps can be combined, where the combined operation operates on groups of bytes. This third alternative embodiment corresponds to the third alternative embodiment for encryption. The combined operations are defined by the following mathematical equations:

$$LC_i' = S_{LC_i}^{-\langle(i+\|C\|/2)mod2\rangle} \text{ where } 0 \leq i \leq (\|C\|/2)-1$$

$$newRC = LC' \oplus (RC\!>\!>\!8) \oplus (RC\!<\!<\!16)$$

$$RC_i' = S_{RC_i}^{-\langle imod2\rangle} \text{ where } 0 \leq i \leq (\|C\|/2)-1$$

$$newLC = RC' \oplus newRC \oplus (newRC\!>\!>\!8)$$

In the first of these four equations, the bytes $LC_i$ of the left half are used, one at a time, to index into the inverse s-boxes.

(If the length of the entries in the inverse s-boxes is increased to more than one byte, as discussed previously, then the boxes are indexed with groups of bytes at one time, instead of one byte at a time.) Each byte is used as the index into inverse s-box zero or one, as before, depending on whether this is an even-numbered or odd-numbered byte. The value located in the inverse s-box is then used as the new value for the byte $LC_i'$ in the left half. The result of the left-half substitution is referred to as LC'.

The second equation explains how the new right half newRC of the block is created. Four steps are involved. First, the contents of the right half are effectively rotated 8 bits to the right. Next, an exclusive OR operation is performed, where the first operand is the left half resulting from the first equation, and the second operand is the rotated right. Next, the right half is effectively rotated 16 bits to the left. Finally, a second exclusive OR operation is performed, where the first operand is the result of the first exclusive OR, and the second operand is the rotated right half. As an example, if the block is 8 bytes long, the bytes of the left half are numbered 0, 1, 2, 3 and the bytes of the right half are numbered 4, 5, 6, 7. The first rotation of the right half (8 bits to the right) rearranges the bytes to 7, 4, 5, 6, which is then the second operand of the first exclusive OR (and the first operand is the bytes 0, 1, 2, and 3 as a group). The second rotation of the right half (16 bits to the left) rearranges the bytes to 6, 7, 4, 5, which is then the second operand of the second exclusive OR.

In the third equation, the bytes $RC_i'$ of the right half (as it existed after the inverse key-dependent substitution, described previously with reference to the second alternative embodiment for decryption) are used, one at a time, to index into the inverse s-boxes. Each byte is used as the index into s-box zero or one, as explained before, depending on whether this is an even-numbered or odd-numbered byte. The value located in the inverse s-box is then used as the new value for the byte $RC_i'$ in the right half. The result of the right-half substitution is referred to as RC'.

The fourth equation explains how the new left half newLC of the block is created. Three steps are involved. First, an exclusive OR operation is performed, where the first operand is the contents of the right half resulting from the third equation, and the second operand is the right half resulting from the second equation. Second, the right half resulting from the second equation is effectively rotated 8 bits to the right. Third, a second exclusive OR operation is performed, where the first operand is the result of the first exclusive OR, and the second operand is the rotated right half.

As discussed in the third alternative embodiment for encryption, groupings other than left-half and right-half are possible. The groupings used for decryption must correspond to those used for encryption.

SUB-KEY GENERATION

Figure 5B:
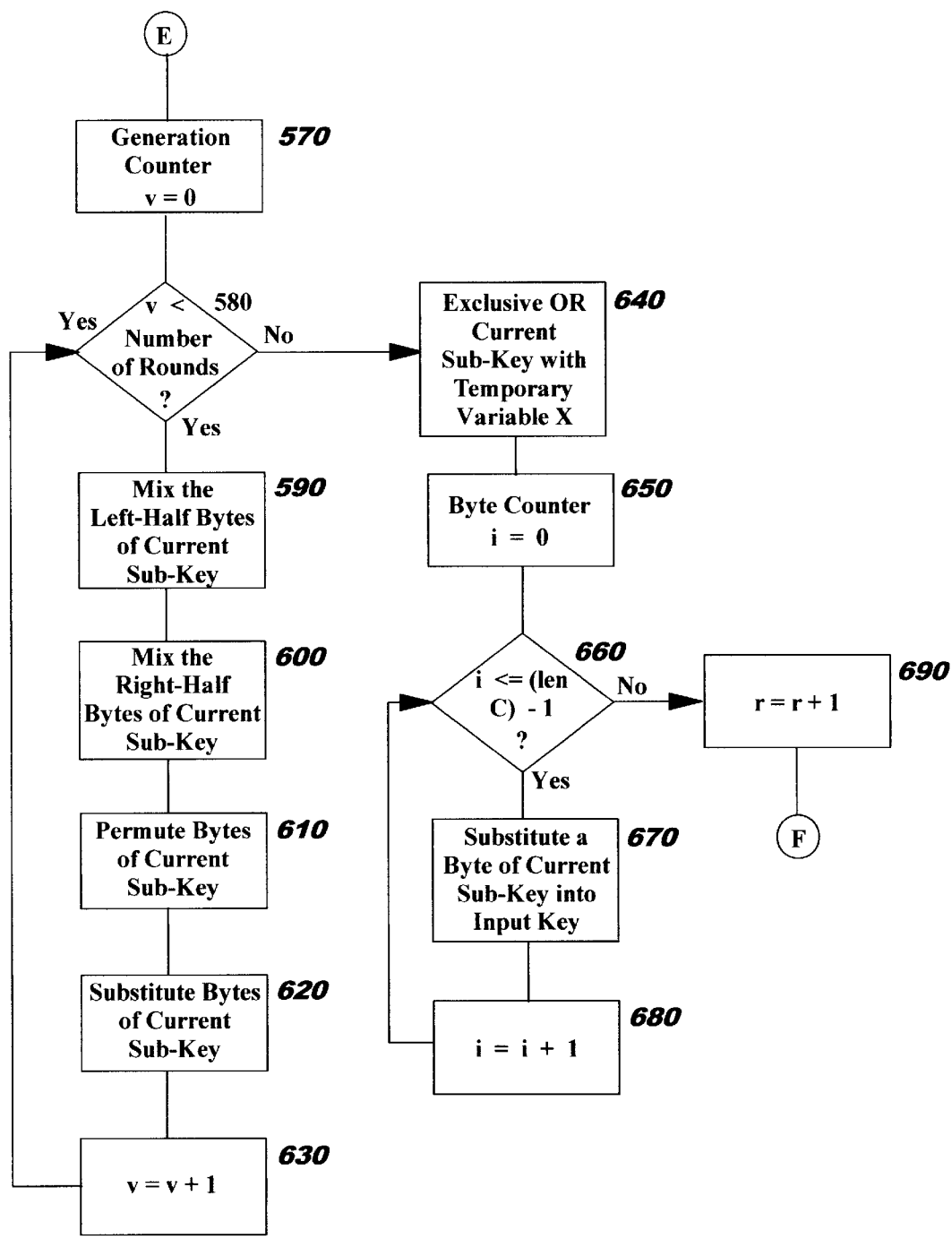

FIG. 5 illustrates use of the present invention to generate sub-keys for each round, using the secret key as input to the sub-key generation process. As discussed previously, a different sub-key is used in each round of encryption, and re-used for the corresponding round of decryption. This sub-key generation may be performed immediately prior to the encryption steps when encrypting a particular input file, or the sub-keys may be generated well in advance of the encryption. In the latter case, the sub-keys would be stored for later use, in order to mimize the time required to encrypt a data file. Regardless of when the sub-keys are generated, the following process is used.

At Step 500, the iteration counter r is initialized, to keep track of how many rounds of sub-key generation processing have been performed. Since a different sub-key is produced during each round of this operation, the iteration counter also indicates how many sub-keys have been generated.

At Step 510, the iteration counter, r, is compared to the number of rounds to be used for enciphering and deciphering. While the iteration counter is less than this value, the test at Step 510 will have a negative result, and processing will continue to Step 520. If the two values are equal, the test will have a positive result, indicating that all the sub-keys have been generated, and the generation process ends.

Step 520 initializes a byte counter, i, to zero. Step 530 compares this byte counter to the size of the blocks that will be used in encrypting and decrypting the data. While the byte counter is less than or equal to the number of bytes in the block, the test at Step 530 has a positive result, and processing continues to Step 540. When the test has a negative result, processing continues at Step 560.

Step 540 distributes any extra bytes of the input secret key among the sub-keys in a fair manner, when the size of the key is bigger than the size of the blocks used in encryption and decryption. This further increases the strength of the encryption, because it allows use of all the random numbers making up the input key, not just a portion of them. For example, if the key contains 24 bytes, and the blocks are 8 bytes long, the 8-byte sub-keys are generated using bytes selected from all 24 bytes of the input key, not just the first 8 bytes. The following mathematical equation defines the process by which these extra bytes are distributed:

$$K_i^{\langle r \rangle} = K_{rL+i \bmod \|K\|}$$

Referring to Table 1 for an explanation of symbols, one skilled in the art will understand that a byte of the current sub-key is being generated from one of the bytes from the input key. The byte counter i points to the current byte of the current sub-key, and the iteration counter r identifies the current sub-key. The particular byte to be used from the input key is determined by the expression "rL+i mod $\|K\|$". As an example, if the block C is 8 bytes long, the input key K is 24 bytes long, the total number of rounds of processing is 11, the iteration counter r is 0, and the byte counter i is 0, the expression is evaluated as follows:

$$L = \left\lceil \frac{\|K\| - \|C\|}{R-1} \right\rceil = \left\lceil \frac{24-8}{10} \right\rceil = \left\lceil \frac{16}{10} \right\rceil = \lceil 1.6 \rceil = 2$$

$$rL+i \bmod \|K\| = 0+0 = 0$$

In this example, the first byte of the input key is the byte to be substituted into the first byte (because i=0) of the first sub-key (because r=0). As another example, if the iteration counter r is 3, the byte counter i is 2, and the other variables are unchanged, the expression (rL+i mod $\|K\|$) becomes ((3 * 2)+(2 mod 24))=(6+2)=8, so that the ninth byte (the byte numbered 8 and denoted by $K_8$) of the input key is substituted into the third byte (because i=2) of the fourth sub-key (because r=3).

Step 550 increments the byte counter i, and control then transfers back to Step 530.

Control transfers to Step 560 when all the bytes of the current sub-key have been generated. Step 560 stores the current sub-key into a temporary variable X, for use later in the generation operation.

Steps 570 through 620 perform operations that are similar to the operations used in the encryption process. The left half of the sub-key is mixed in Step 590, followed by mixing of the right half in Step 600. The sub-key bytes are permuted in Step 620. Key-dependent substitution is done in Step 620.

At Step 570, a generation counter v is initialized to 0. This counter is used to control the number of iterations of performing the mixing, permutation, and key-dependent substitution steps on the current sub-key. Step 580 tests to see whether this generation counter is equal to the number of rounds of processing to be used for encryption and decryption. If this test has a positive result, another round of generation will be performed by continuing on to Step 590. If this test has a negative result, then control transfers to Step 640.

Step 590 mixes the bytes of the left half of the current sub-key, according to the following mathematical equation:

$$K_i^{\langle r \rangle} = S_{K_i^{\langle r \rangle} \oplus K_{i+\|C\|/2}^{\langle r \rangle} \oplus K_{(i-1 \bmod \|C\|/2)+\|C\|/2}}^{\langle i \bmod 2 \rangle}$$

where $0 \le i \le (\|C\|/2) - 1$

This left-half mixing of sub-key bytes is identical to the left-half mixing performed on the input block, except that instead of using the bytes of the block to index into an s-box, the bytes of the current sub-key (where the iteration counter r identifies the current sub-key) are used. Each byte of this sub-key is pointed to using the byte counter i.

Step 600 mixes the bytes of the right half of the current sub-key, according to the following mathematical equation:

$$K_{i+\|C\|/2}^{\langle r \rangle} = S_{K_{i+\|C\|/2}^{\langle r \rangle} \oplus K_{i-1 \bmod \|C\|/2}^{\langle r \rangle} \oplus K_{(i+2 \bmod \|C\|/2)}}^{\langle i+\|C\|/2 \bmod 2 \rangle}$$

where $0 \le i \le (\|C\|/2) - 1$

This right-half mixing of sub-key bytes is identical to the right-half mixing performed on the input block, except that instead of using the bytes of the block to index into an s-box, the bytes of the current sub-key (where the iteration counter r identifies the current sub-key) are used. Each byte of this sub-key is pointed to using the byte counter i.

Step 610 permutes the bytes of the current sub-key, according to the following mathematical equation:

$$K_i^{\langle r \rangle} \Leftrightarrow K_{i+\|C\|/2}^{\langle r \rangle} \text{ where } 0 \le i \le (\|C\|/2) - 1$$

Again, the process used is identical to that used when permuting the input block, where the bytes from the left half of the current sub-key are each swapped with the corresponding byte from the right half of the current sub-key.

Step 620 performs a key-dependent substitution on each byte of the current sub-key, according to the following mathematical equation:

$$K_i^{\langle r \rangle} = S_{K_{i-1 \bmod \|C\|}^{\langle r \rangle} \oplus K_i^{\langle r \rangle}}^{\langle i \bmod 2 \rangle} \text{ where } 0 \le i \le (\|C\| - 1)$$

This substitution is similar, but not identical, to that performed on the input block. The value to be substituted for the with byte of the current ("rth") sub-key is retrieved from one of the s-boxes, where s-box zero is used if i is even, and s-box one is used if i is odd. The value used to index into the s-box is computed by performing an exclusive OR using two bytes of the current sub-key. The byte used for the first operand is located by effectively rotating the current sub-key one byte to the right, then using the byte from this rotated sub-key that corresponds to the byte counter i. The second operand is the byte of the current sub-key pointed to by the byte counter (without having rotated the sub-key). For example, if the sub-keys and blocks are 8 bytes long, and the byte counter is 0, the first operand will be the byte numbered "i−1 mod ||C||", which in this case evaluates to ((0−1) mod 8), or 7. This is the eighth byte of the current sub-key. The second operand will be the first byte, the byte numbered 0, of the same sub-key.

At Step 630, the generation counter v is incremented. Control then transfers back to Step 580.

Control reaches Step 640 when all the iterations of mixing, permutation, and key-dependent substitution have completed for this sub-key. At this step, the current sub-key is exclusive OR'd with the temporary variable X in which a value was saved at Step 560. The result of the exclusive OR is substituted as the new value of the current sub-key.

At Step 650, the byte counter i is again initialized to 0. Step 660 compares the byte counter value to the length of the blocks. If the test at Step 660 has a positive result, control transfers to Step 670; otherwise, control transfers to Step 690.

Step 670 takes a byte from the newly-generated sub-key, and substitutes it back into the original input key, which results in further randomization of the sub-keys being generated. The following mathematical equation defines the process by which this is done:

$$K_{rL+i \bmod \|K\|} = K_i^{<r>}$$

The byte counter i points to the current byte of the current sub-key, and the iteration counter r identifies the current sub-key. This byte from the sub-key will be substituted into the input key. The position at which this byte will be substituted is determined by the expression "rL+i mod ||K||". Using the same example used above for inserting the byte at Step 540, where the block size C is 8 bytes, the input key K is 24 bytes long, the total number of rounds of processing is 11, the iteration counter r is 0, and the byte counter i is 0, the result is that the first byte of the first sub-key is substituted into the first byte of the input key. If the iteration counter r is 3, the byte counter i is 2, and the other variables are unchanged, the expression becomes ((3 * 2)+(2 mod 24))= (6+2)=8, so that the third byte (because i=2) of the fourth sub-key (because r=3 is substituted for the ninth byte (the byte numbered 8) of the input key.

At Step 680, the byte counter i is incremented. Control then transfers back to Step 660.

Control reaches Step 690 when a complete round of sub-key generation (consisting of generating the sub-key bytes, encrypting the bytes, and substituting the encrypted bytes back into the input key) has completed. At Step 690, the iteration counter r is incremented. Control then transfers back to Step 510.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

TABLE 1

| SYMBOL | DEFINITION |
|---|---|
| C | The plaintext (input data) or ciphertext (encrypted) block. |
| $\|C\|$ | The length of C in bytes, where $\|C\|$ is an even integer and $\|C\| \geq 8$. |
| $C_i$ | Byte i of C, where $0 \leq i \leq \|C\| - 1$. |
| R | An integer number denoting the total number of rounds of the encryption algorithm, where $R \geq \lceil(\|C\| + 16)/5\rceil$. The notation $\lceil x \rceil$ denotes the smallest integer greater than or equal to x. For example, if x = 3.2, then $\lceil x \rceil = 4$. |
| K | The symmetric (secret) encryption/decryption input key. |
| $\|K\|$ | The length of K in bytes. $\|K\|$ is an integer in the following interval: $\|C\| \leq \|K\| \leq \|C\| \times R$. |
| $K_j$ | Byte j of key K, where $0 \leq j \leq \|K\| - 1$. |
| $K^{<r>}$ | The rth sub-key derived from K, where $0 \leq r \leq R - 1$. Each sub-key is of length $\|C\|$ bytes. |
| $K_i^{<r>}$ | Byte i of sub-key $K^{<r>}$, where $0 \leq i \leq \|C\| - 1$. |
| L | An integer defined as $L = \lceil(\|K\| - \|C\|)/(R - 1)\rceil$. When the input key is bigger than the block size, L equally divides the additional input key bytes among the sub-keys. |
| $S_j^{<n>}$ | The jth entry of the nth s-box, where $0 \leq n \leq 1$, and $0 \leq j \leq 255$. Each s-box contains 256 non-repeating 8-bit values which are indexed from 0 to 255. The jth entry of the inverse of the nth s-box is denoted by $S_j^{-<n>}$. |
| $A \leftrightarrow B$ | "↔" denotes swapping of A with B. |
| $A \oplus B$ | "⊕" denotes exclusive ORing A and B. |

What is claimed is:

1. In a computing environment, computer-readable code for providing a byte-oriented symmetric key block cipher which supports a variable length symmetric input key, a variable length block, and a variable number of rounds, said computer-readable code embodied on a computer-readable medium and comprising:

computer-readable program code means for determining a number of rounds of cipher processing to use as said variable number of rounds, a key length of said variable length symmetric input key, and a block length of said variable length block;

computer-readable program code means for generating a plurality of sub-keys using said symmetric input key as an input value, wherein each of said generated sub-keys is equal in length to said block length and where a distinct one of said sub-keys is generated for each of said number of rounds;

computer-readable program code means for obtaining an input data block to be encrypted, wherein said input data block comprises a plurality of input data bytes, said plurality being equal in number to said block length; and computer-readable program code means for iteratively performing a set of round functions a number of times equal to said number of rounds in order to encrypt said input data block, wherein said set of round functions comprises a mixing function, a permuting function, and a key-dependent substitution function, and wherein said computer-readable program code means for iteratively performing further comprises:

computer-readable program code means for performing said mixing function by mixing each of said input data bytes using a first XOR operation and a second XOR operation, wherein said first and second XOR operations are different, followed by a first substitution-box (S-box) lookup operation, thereby creating a plurality of mixed bytes;

computer-readable program code means for performing said permuting function by swapping each of said mixed bytes, thereby creating a plurality of permuted bytes;

computer-readable program code means for performing said key-dependent substitution function by substituting a byte value for each of said permuted bytes, wherein said byte value is determined by performing a third XOR operation followed by a second S-box lookup operation, thereby creating a plurality of substituted bytes; and computer-readable program code means for treating said plurality of substituted bytes as said plurality of input data bytes for a subsequent iteration of said computer-readable program code means for iteratively performing, provided said number of times has not been reached.

2. The computer-readable code according to claim 1, wherein said computer-readable program code means for performing said mixing function further comprises:

computer-readable program code means for dividing said plurality of input data bytes into a left input half and a right input half;

computer-readable program code means for performing a first mixing operation on said left input half and a second mixing operation on said right input half, wherein said second mixing operation uses a different selection of operands for said first and second XOR operations than does said first mixing operation;

computer-readable program code means for using each byte of a result of said second XOR operation of said first mixing operation as a lookup index for said first S-box lookup operation to retrieve bytes of a new left half; and computer-readable pro=am code means for using each byte of an output of said second XOR operation of said second mixing operation as said lookup index for said first S-box lookup operation to retrieve bytes of a new right half.

3. The computer-readable code according to claim 2, wherein:

said computer-readable program code means for performing said first mixing operation further comprises:
  computer-readable program code means for using an identically-numbered byte from said left input half and said right input half as operands of said first XOR operation; and
  computer-readable program code means for using a result of said first XOR operation and a byte from said right input half that has been effectively rotated right one byte as operands of said second XOR operation; and said computer-readable program code means for performing said second mixing operation further comprises:
  computer-readable program code means for using a selected byte from said right input half and a previously-mixed byte from said new left half that has been effectively rotated right one byte as operands of said first XOR operation; and
  computer-readable program code means for using an output of said first XOR operation and a different previously-mixed byte from said new left half that has been effectively rotated left two bytes as operands of said second XOR operation.

4. The computer-readable code according to claim 1, wherein said computer-readable program code means for performing said mixing function and said computer-readable program code means for performing said key-dependent substitution function perform said first S-box lookup operation and said second S-box lookup operational, respectively, by accessing a selected one of two distinct S-boxes using a one-byte index, each of said S-boxes having 256 distinct entries, each of said entries being a one-byte value.

5. The computer-readable code according to claim 1, wherein one or more of said computer-readable program code means is embodied in a hardware chip.

6. The computer-readable code according to claim 1, wherein said computer-readable program code means for performing said permuting function further comprises:

computer-readable program code means for dividing said plurality of mixed bytes into a left mixed half and a right mixed half; and computer-readable program code means for swapping said left mixed half with said right mixed half.

7. The computer-readable code according to claim 1, wherein said computer-readable program code means for performing said key-dependent substitution function further comprises:

computer-readable program code means for using a sub-key byte from a selected one of said generated sub-keys which is uniquely associated with said round as an operand of said third XOR operation, along with said each permuted byte; and computer-readable program code means for performing said second S-box lookup operation using each byte of a result of said third XOR operation as an index.

8. The computer-readable code according to claim 1, wherein particular values of one or more of said number of rounds, said key length, and said block length are determined in advance in order to optimize said computer-readable code, and wherein said computer-readable program code means for determining therefore operates as if said one or more particular values are fixed.

9. The computer-readable code according to claim 1, further comprising:

computer-readable program code means for decrypting said encrypted data block, resulting in restoration of said plurality of input data bytes, by performing a set of inverse round functions said number of times equal to said number of rounds, wherein said set of inverse round functions comprises an inverse key-dependent substitution function which is inverse to said key-dependent substitution function, an inverse permuting function which is inverse to said permuting function, and an inverse mixing function which is inverse to said mixing function.

10. A system for providing a byte-oriented symmetric key block cipher which supports a variable length symmetric input key, a variable length block, and a variable number of rounds, comprising:

means for determining a number of rounds of cipher processing to use as said variable number of rounds, a key length of said variable length symmetric input key, and a block length of said variable length block;

means for generating a plurality of sub-keys using said symmetric input key as an input value, wherein each of said generated sub-keys is equal in length to said block length and where a distinct one of said sub-keys is generated for each of said number of rounds;

means for obtaining an input data block to be encrypted, wherein said input data block comprises a plurality of input data bytes, said plurality being equal in number to said block length; and means for iteratively performing a set of round functions a number of times equal to said number of rounds in order to encrypt said input data block, wherein said set of round functions comprises a mixing function, a permuting function, and a key-dependent substitution function, and wherein said means for iteratively performing further comprises:
- means for performing said mixing function by mixing each of said input data bytes using a first XOR operation and a second XOR operation, wherein said first and second XOR operations are different, followed by a first substitution-box (S-box) lookup operation, thereby creating a plurality of mixed bytes;
- means for performing said permuting function by swapping each of said mixed bytes, thereby creating a plurality of permuted bytes;
- means for performing said key-dependent substitution function by substituting a byte value for each of said permuted bytes, wherein said byte value is determined by performing a third XOR operation followed by a second S-box lookup operation, thereby creating a plurality of substituted bytes; and
- means for treating said plurality of substituted bytes as said plurality of input data bytes for a subsequent iteration of said means for iteratively performing, provided said number of times has not been reached.

11. The system according to claim 10, wherein said means for performing said mixing function further comprises:
- means for dividing said plurality of input data bytes into a left input half and a right input half;
- means for performing a first mixing operation on said left input half and a second mix operation said if right half, wherein said second mixing operation uses a different selection of operands for said first and said second XOR operations than does said first mixing operation;
- means for using each byte of a result of said second XOR operation of said first mixing operation as a lookup index for said first S-box lookup operation to retrieve bytes of a new left half; and
- means for using each byte of an output of said second XOR operation of said second mixing operation as said lookup index for said first S-box lookup operation to retrieve bytes of a new right half.

12. The system according to claim 11, wherein:
said means for performing said first mixing operation further comprises:
- means for using an identically-numbered byte from said left input half and said right input half as operands of said first XOR operation; and
- means for using a result of said first XOR operation and a byte from said right input half that has been effectively rotated right one byte as operands of said second XOR operation; and said means for performing said second mixing operation further comprises:
- means for using a selected byte from said right input half and a previously-mixed byte from said new left half that has been effectively rotated right one byte as operands of said first XOR operation; and
- means for using an output of said first XOR operation and a different previously-mixed byte from said new left half that has been effectively rotated left two bytes as operands of said second XOR operation.

13. The system according to claim 10, wherein said means for performing said mixing function and said means for performing said key-dependent substitution function perform said first S-box lookup operation and said second S-box lookup operation, respectively, by accessing a selected one of two distinct S-boxes using a one-byte index, each of said S-boxes having 256 distinct entries, each of said entries being a one-byte value.

14. The system according to claim 10, wherein one or more of said means is embodied in a hardware chip.

15. The system according to claim 10, wherein said means for performing said permuting function further comprises:
- means for dividing said plurality of mixed bytes into a left mixed half and a right mixed half; and
- means for swapping said left mixed half with said right mixed half.

16. The system according to claim 10, wherein said means for performing said key-dependent substitution function further comprises:
- means for using a sub-key byte from a selected one of said generated sub-keys which is uniquely associated with said round as an operand of said third XOR operation, along with said each permuted byte; and
- means for performing said second S-box lookup operation using each byte of a result of said third XOR operation as an index.

17. The system according to claim 10, wherein particular values of one or more of said number of rounds, said key length, and said block length are determined in advance in order to optimize said system, and wherein said means for determining therefore operates as if said one or more particular values are fixed.

18. The system according to claim 10, further comprising:
- means for decrypting said encrypted data block, resulting in restoration of said plurality of input data bytes, by performing a set of inverse round functions said number of times equal to said number of rounds, wherein said set of inverse round functions comprises an inverse key-dependent substitution function which is inverse to said key-dependent substitution function, an inverse permuting function which is inverse to said permuting function, and an inverse mixing function which is inverse to said mixing function.

19. A method of providing a byte-oriented symmetric key block cipher which supports a variable length symmetric input key, a variable length block, and a variable number of rounds, comprising the steps of:
- determining a number of rounds of cipher processing to use as said variable number of rounds, a key length of said variable length symmetric input key, and a block length of said variable length block;
- generating a plurality of sub-keys using said symmetric input key as an input value, wherein each of said generated sub-keys is equal in length to said block length and where a distinct one of said sub-keys is generated for each of said number of rounds;
- obtaining an input data block to be encrypted, wherein said input data block comprises a plurality of input data bytes, said plurality being equal in number to said block length; and
- iteratively performing a set of round functions a number of times equal to said number of rounds in order to encrypt said input data block, wherein said set of round functions comprises a mixing function, a permuting function, and a key-dependent substitution function, and wherein said iteratively performing step further comprises the steps of:
    - performing said mixing function by mixing each of said input data bytes using a first XOR operation and a second XOR operation, wherein said first and second XOR operations are different, followed by a first substitution-box (S-box) lookup operation, thereby creating a plurality of mixed bytes;

performing said permuting function by swapping each of said mixed bytes, thereby creating a plurality of permuted bytes;

performing said key-dependent substitution function by substituting a byte value for each of said permuted bytes, wherein said byte value is determined by performing a third XOR operation followed by a second S-box lookup operation, thereby creating a plurality of substituted bytes; and treating said plurality of substituted bytes as said plurality of input data bytes for a subsequent iteration of said iteratively performing step, provided said number of times has not been reached.

20. The method according to claim 19, wherein said step of performing said mixing function further comprises the steps of:

dividing said plurality of input data bytes into a left input half and a right input half;

performing a first mixing operation on said left input half and a second mixing operation on said right half, wherein said second mixing operation uses a different selection of operands for said first and second XOR operations than does said first mixing operation;

using each byte of a result of said second XOR operation of said first mixing operation as a lookup index for said first S-box lookup operation to retrieve bytes of a new left half; and using each byte of an output of said second XOR operation of said second mixing operation as said lookup index for said first S-box lookup operation to retrieve bytes of a new right half.

21. The method according to claim 20, wherein:

said step of performing said first mixing operation further comprises the steps of:

using an identically-numbered byte from said left input half and said right input half as operands of said first XOR operation; and using a result of said first XOR operation and a byte from said right input half that has been effectively rotated right one byte as operands of said second XOR operation; and said step of performing said second mixing operation further comprises the steps of:

using a selected byte from said right input half and a previously-mixed byte from said new left half that has been effectively rotated right one byte as operands of said first XOR operation; and using an output of said first XOR operation and a different previously-mixed byte from said new left half that has been effectively rotated left two bytes as operands of said second XOR operation.

22. The method according to claim 19, wherein said step of performing said mixing function and said step of performing said key-dependent substitution function perform said first S-box lookup operation and said second S-box lookup operation, respectively, by accessing a selected one of two distinct S-boxes using a one-byte index, each of said S-boxes having 256 distinct entries, each of said entries being a one-byte value.

23. The method according to claim 19, wherein one or more of said steps is embodied in a hardware chip.

24. The method according to claim 19, wherein said step of performing said permuting function further comprises the steps of dividing said plurality of mixed bytes into a left mixed half and a right mixed half; and swapping said left mixed half with said right mixed half.

25. The method according to claim 19, wherein said step of performing said key-dependent substitution function further comprises the steps of:

using a sub-key byte from a selected one of said generated sub-keys which is uniquely associated with said round as an-operand of said third XOR operation, along with said each permuted byte; and performing said second S-box lookup operation using each byte of a result of said third XOR operation as an index.

26. The method according to claims 19, wherein particular values of one or more of said number of rounds, said key length, and said block length are determined in advance in order to optimize said method, and wherein said step of determining therefore operates as if said one or more particular values are fixed.

27. The method according to claim 19, further comprising the step of:

decrypting said encrypted data block, resulting in restoration of said plurality of input data bytes, by performing a set of inverse round functions said number of times equal to said number of rounds, wherein said set of inverse round functions comprises an inverse key-dependent substitution function which is inverse to said key-dependent substitution function, an inverse permuting function which is inverse to said permuting function, and an inverse mixing function which to said mixing function.

* * * * *